(12) United States Patent
Hiebl

(10) Patent No.: US 8,639,448 B2
(45) Date of Patent: Jan. 28, 2014

(54) METHOD FOR OBJECT RECOGNITION

(75) Inventor: Manfred Hiebl, Sauerlach (DE)

(73) Assignee: EADS Deutschland GmbH, Ottobrunn (DE)

( * ) Notice: Subject to any disclaimer, the term of this patent is extended or adjusted under 35 U.S.C. 154(b) by 923 days.

(21) Appl. No.: 12/782,414

(22) Filed: May 18, 2010

(65) Prior Publication Data

US 2010/0318300 A1 Dec. 16, 2010

(30) Foreign Application Priority Data

May 18, 2009 (DE) .......................... 10 2009 021 785

(51) Int. Cl.
*G06F 19/00* (2011.01)
*G06K 9/00* (2006.01)

(52) U.S. Cl.
USPC ............................................. 702/19; 382/104

(58) Field of Classification Search
USPC .......................................................... 702/19
See application file for complete search history.

(56) References Cited

U.S. PATENT DOCUMENTS

| | | | |
|---|---|---|---|
| 5,963,653 A | 10/1999 | McNary et al. | |
| 6,707,932 B1 * | 3/2004 | Chakraborty | ................. 382/113 |
| 6,757,668 B1 | 6/2004 | Goebel et al. | |
| 7,058,206 B1 * | 6/2006 | Janssen et al. | ................. 382/104 |
| 8,036,425 B2 * | 10/2011 | Hou | ............................... 382/103 |
| 2007/0136224 A1 | 6/2007 | Aboutalib | |

OTHER PUBLICATIONS

German Office Action dated Mar. 20, 2013 (four (4) pages).

* cited by examiner

*Primary Examiner* — Bryan Bui
(74) *Attorney, Agent, or Firm* — Crowell & Moring LLP

(57) ABSTRACT

A method for recognizing an object that has a plurality of expressions of abstract object characteristics, and is associated with an object characteristic class of a hierarchical system of object characteristic classes stored in a first memory. The method includes i) observing at least one location at which the object is presumed to be present, using a plurality of sensors in a sensor population, each of said sensors responding to at least one object characteristic and accordingly emitting a sensor signal; ii) checking whether each of the emitted sensor signals exceeds a specified threshold value for the sensor signals, and accepting sensor signals which exceed the threshold value; iii) pairing combinations of the sensor characteristics, for the accepted sensor signals obtained in ii) to form identification characteristic pairs; iv) comparing the population of identification characteristic pairs obtained in iii) to the object characteristic classes stored in the first memory; and v) identifying the object, based on the object characteristic class, whose object characteristic pairs are identical to the identification characteristic pairs obtained in iii).

20 Claims, 14 Drawing Sheets

| | | | | | |
|---|---|---|---|---|---|
| ● ● | ● ● | 1 |
| ● ● | ● ○ | 2 |
| ● ● | ○ ● | 3 |
| ● ○ | ● ● | 4 |
| ○ ● | ● ● | 5 |
| ● ● | ○ ○ | 6 |
| ● ○ | ● ○ | 7 |
| ● ○ | ○ ● | 8 |
| ○ ● | ● ○ | 9 |
| ○ ● | ○ ● | 10 |
| ○ ○ | ● ● | 11 |
| ● ○ | ○ ○ | 12 |
| ○ ● | ○ ○ | 13 |
| ○ ○ | ● ○ | 14 |
| ○ ○ | ○ ● | 15 |
| ○ ○ | ○ ○ | 16 |

Fig. 4

| | Class | S:W | ss | sw | ww | |
|---|---|---|---|---|---|---|
| Homozygous | 1 | 4:0 | 4 | 0 | 0 | One Color |
| | 6 | 0:4 | 0 | 0 | 4 | |
| Heterozygous | 4 | 2:2 | 0 | 4 | 0 | |
| Homozygous + Heterozygous | 2 | 3:1 | 2 | 2 | 0 | Two colors |
| | 3 | 2:2 | 1 | 2 | 1 | |
| | 5 | 1:3 | 0 | 2 | 2 | |

Fig. 5

|  | Class | R:G:B | rr | rg | gg | gb | bb | br |  |
|---|---|---|---|---|---|---|---|---|---|
| Homozygous | 1 | 4:0:0 | 4 | 0 | 0 | 0 | 0 | 0 | One Color |
|  | 11 | 0:4:0 | 0 | 0 | 4 | 0 | 0 | 0 |  |
|  | 21 | 0:0:4 | 0 | 0 | 0 | 0 | 4 | 0 |  |
| Heterozygous + homozygous | 2 | 3:1:0 | 2 | 2 | 0 | 0 | 0 | 0 | Two Colors |
|  | 3 | 3:0:1 | 2 | 0 | 0 | 0 | 0 | 2 |  |
|  | 4 | 1:3:0 | 0 | 2 | 2 | 0 | 0 | 0 |  |
|  | 5 | 0:3:1 | 0 | 0 | 2 | 2 | 0 | 0 |  |
|  | 6 | 1:0:3 | 0 | 0 | 0 | 0 | 2 | 2 |  |
|  | 7 | 0:1:3 | 0 | 0 | 0 | 2 | 2 | 0 |  |
| Heterozygous + Homozygous | 8 | 2:2:0 | 1 | 2 | 1 | 0 | 0 | 0 |  |
|  | 9 | 2:0:2 | 1 | 0 | 0 | 0 | 1 | 2 |  |
|  | 10 | 0:2:2 | 0 | 0 | 1 | 2 | 1 | 0 |  |
| Heterozygous | 12 | 2:2:0 | 0 | 4 | 0 | 0 | 0 | 0 |  |
|  | 13 | 2:0:2 | 0 | 0 | 0 | 0 | 0 | 4 |  |
|  | 14 | 0:2:2 | 0 | 0 | 0 | 4 | 0 | 0 |  |
| Heterozygous + Homozygous | 15 | 2:1:1 | 1 | 1 | 0 | 1 | 0 | 1 | Three colors |
|  | 16 | 1:2:1 | 0 | 1 | 1 | 1 | 0 | 1 |  |
|  | 17 | 1:1:2 | 0 | 1 | 0 | 1 | 1 | 1 |  |
| Heterozugous | 18 | 2:1:1 | 0 | 2 | 0 | 0 | 0 | 2 |  |
|  | 19 | 1:2:1 | 0 | 2 | 0 | 2 | 0 | 0 |  |
|  | 20 | 1:1:2 | 0 | 0 | 0 | 2 | 0 | 2 |  |

| Genotypes | Homozygotes | Heterozygotes | Phenotypes | Sets of parents | Mendelian classes |
|---|---|---|---|---|---|
| 4 | 2 | 1 | 3 | 16 | 6 |
| 9 | 3 | 3 | 6 | 81 | 21 |
| 16 | 4 | 6 | 10 | 256 | 55 |
| ... | ... | ... | ... | ... | ... |
| $m^2$ | $m$ | $(m^2-m)/2$ | $(m^2+m)/2$ | $m^4$ | $\sum_{i=0}^{m-1}\left(\dfrac{m^2+m}{2}-i\right)$ |

| $F_n$ | $T_{1,ss}^{(n)}$ | $T_{1,sw}^{(n)}$ | $T_{1,ww}^{(n)}$ | $T_1^{(n)}$ | $T_{2,ss}^{(n)}$ | $T_{2,sw}^{(n)}$ | $T_{2,ww}^{(n)}$ | $T_2^{(n)}$ |
|---|---|---|---|---|---|---|---|---|
| F1 | 4 | 0 | 0 | 4 | 2 | 2 | 0 | 4 |
| F2 | 24 | 0 | 0 | 24 | 13 | 10 | 1 | 24 |
| F3 | 144 | 0 | 0 | 144 | 81 | 54 | 9 | 144 |
| F4 | 864 | 0 | 0 | 864 | 507 | 282 | 75 | 864 |
| F5 | 5184 | 0 | 0 | 5184 | 3141 | 1494 | 549 | 5184 |
| F6 | 31104 | 0 | 0 | 31104 | 19395 | 7866 | 3843 | 31104 |
| F7 | 186624 | 0 | 0 | 186624 | 119205 | 41526 | 25893 | 186624 |
| F8 | 1119744 | 0 | 0 | 1119744 | 730323 | 218970 | 170451 | 1119744 |
| F9 | 6718464 | 0 | 0 | 6718464 | 4461237 | 1155222 | 1102005 | 6718464 |

| $F_n$ | $T_{7,ss}^{(n)}$ | $T_{7,sw}^{(n)}$ | $T_{7,ww}^{(n)}$ | $T_7^{(n)}$ | $T_{6,ss}^{(n)}$ | $T_{6,sw}^{(n)}$ | $T_{6,ww}^{(n)}$ | $T_6^{(n)}$ |
|---|---|---|---|---|---|---|---|---|
| F1 | 1 | 2 | 1 | 4 | 0 | 4 | 0 | 4 |
| F2 | 5 | 14 | 5 | 24 | 6 | 12 | 6 | 24 |
| F3 | 39 | 66 | 39 | 144 | 30 | 84 | 30 | 144 |
| F4 | 249 | 366 | 249 | 864 | 234 | 396 | 234 | 864 |
| F5 | 1647 | 1890 | 1647 | 5184 | 1494 | 2196 | 1494 | 5184 |
| F6 | 10521 | 10062 | 10521 | 31104 | 9882 | 11340 | 9882 | 31104 |
| F7 | 66879 | 52866 | 66879 | 186624 | 63126 | 60372 | 63126 | 186624 |
| F8 | 420201 | 279342 | 420201 | 1119744 | 401274 | 317196 | 401274 | 1119744 |
| F9 | 2623023 | 1472418 | 2623023 | 6718464 | 2521206 | 1676052 | 2521206 | 6718464 |

| $F_n$ | $T_{12,ss}^{(n)}$ | $T_{12,sw}^{(n)}$ | $T_{12,ww}^{(n)}$ | $T_{12}^{(n)}$ | $T_{16,ss}^{(n)}$ | $T_{16,sw}^{(n)}$ | $T_{16,ww}^{(n)}$ | $T_{16}^{(n)}$ |
|---|---|---|---|---|---|---|---|---|
| F1 | 0 | 2 | 2 | 4 | 0 | 0 | 4 | 4 |
| F2 | 1 | 10 | 13 | 24 | 0 | 0 | 24 | 24 |
| F3 | 9 | 54 | 81 | 144 | 0 | 0 | 144 | 144 |
| F4 | 75 | 282 | 507 | 864 | 0 | 0 | 864 | 864 |
| F5 | 549 | 1494 | 3141 | 5184 | 0 | 0 | 5184 | 5184 |
| F6 | 3843 | 7866 | 19395 | 31104 | 0 | 0 | 31104 | 31104 |
| F7 | 25893 | 41526 | 119205 | 186624 | 0 | 0 | 186624 | 186624 |
| F8 | 170451 | 218970 | 730323 | 1119744 | 0 | 0 | 1119744 | 1119744 |
| F9 | 1102005 | 1155222 | 4461237 | 6718464 | 0 | 0 | 6718464 | 6718464 |

Fig. 8

| $F_n$ | $P_1$ | $H_1$ | $Q_1$ | $p$ | $q$ | $P_2$ | $H_2$ | $Q_2$ | $p$ | $q$ |
|---|---|---|---|---|---|---|---|---|---|---|
| F1 | 1 | 0 | 0 | 1 | 0 | 0.5 | 0.5 | 0 | 0.75 | 0.25 |
| F2 | 1 | 0 | 0 | 1 | 0 | 0.542 | 0.416 | 0.042 | 0.75 | 0.25 |
| F3 | 1 | 0 | 0 | 1 | 0 | 0.563 | 0.374 | 0.063 | 0.75 | 0.25 |
| F4 | 1 | 0 | 0 | 1 | 0 | 0.587 | 0.326 | 0.087 | 0.75 | 0.25 |
| F5 | 1 | 0 | 0 | 1 | 0 | 0.606 | 0.288 | 0.106 | 0.75 | 0.25 |
| F6 | 1 | 0 | 0 | 1 | 0 | 0.624 | 0.252 | 0.124 | 0.75 | 0.25 |
| F7 | 1 | 0 | 0 | 1 | 0 | 0.639 | 0.222 | 0.139 | 0.75 | 0.25 |
| F8 | 1 | 0 | 0 | 1 | 0 | 0.652 | 0.196 | 0.152 | 0.75 | 0.25 |
| F9 | 1 | 0 | 0 | 1 | 0 | 0.664 | 0.172 | 0.164 | 0.75 | 0.25 |
| $F_n$ | $P_7$ | $H_7$ | $Q_7$ | $p$ | $q$ | $P_6$ | $H_6$ | $Q_6$ | $p$ | $q$ |
| F1 | 0.25 | 0.5 | 0.25 | 0.5 | 0.5 | 0 | 1 | 0 | 0.5 | 0.5 |
| F2 | 0.208 | 0.584 | 0.208 | 0.5 | 0.5 | 0.25 | 0.5 | 0.25 | 0.5 | 0.5 |
| F3 | 0.271 | 0.458 | 0.271 | 0.5 | 0.5 | 0.208 | 0.584 | 0.208 | 0.5 | 0.5 |
| F4 | 0.288 | 0.424 | 0.288 | 0.5 | 0.5 | 0.271 | 0.458 | 0.271 | 0.5 | 0.5 |
| F5 | 0.318 | 0.364 | 0.318 | 0.5 | 0.5 | 0.288 | 0.424 | 0.288 | 0.5 | 0.5 |
| F6 | 0.338 | 0.324 | 0.338 | 0.5 | 0.5 | 0.318 | 0.364 | 0.318 | 0.5 | 0.5 |
| F7 | 0.358 | 0.284 | 0.358 | 0.5 | 0.5 | 0.338 | 0.324 | 0.338 | 0.5 | 0.5 |
| F8 | 0.375 | 0.250 | 0.375 | 0.5 | 0.5 | 0.358 | 0.284 | 0.358 | 0.5 | 0.5 |
| F9 | 0.390 | 0.220 | 0.390 | 0.5 | 0.5 | 0.375 | 0.250 | 0.375 | 0.5 | 0.5 |
| $F_n$ | $P_{12}$ | $H_{12}$ | $Q_{12}$ | $p$ | $q$ | $P_{16}$ | $H_{16}$ | $Q_{16}$ | $p$ | $q$ |
| F1 | 0 | 0.5 | 0.5 | 0.25 | 0.75 | 0 | 0 | 1 | 0 | 1 |
| F2 | 0.042 | 0.416 | 0.542 | 0.25 | 0.75 | 0 | 0 | 1 | 0 | 1 |
| F3 | 0.063 | 0.374 | 0.563 | 0.25 | 0.75 | 0 | 0 | 1 | 0 | 1 |
| F4 | 0.087 | 0.326 | 0.587 | 0.25 | 0.75 | 0 | 0 | 1 | 0 | 1 |
| F5 | 0.106 | 0.288 | 0.606 | 0.25 | 0.75 | 0 | 0 | 1 | 0 | 1 |
| F6 | 0.124 | 0.252 | 0.624 | 0.25 | 0.75 | 0 | 0 | 1 | 0 | 1 |
| F7 | 0.139 | 0.222 | 0.639 | 0.25 | 0.75 | 0 | 0 | 1 | 0 | 1 |
| F8 | 0.152 | 0.196 | 0.652 | 0.25 | 0.75 | 0 | 0 | 1 | 0 | 1 |
| F9 | 0.164 | 0.172 | 0.664 | 0.25 | 0.75 | 0 | 0 | 1 | 0 | 1 |

Fig. 9

| $k$ | $T_{k,ss}^{(1)}$ | $T_{k,sw}^{(1)}$ | $T_{k,ww}^{(1)}$ | $P$ | $H$ | $Q$ | $p$ | $q$ |
|---|---|---|---|---|---|---|---|---|
| 1 | 4 | 0 | 0 | 1 | 0 | 0 | 1 | 0 |
| 2-5 | 2 | 2 | 0 | 0,5 | 0,5 | 0 | 0,75 | 0,25 |
| 6 | 0 | 4 | 0 | 0 | 1 | 0 | 0,5 | 0,5 |
| 7-10 | 1 | 2 | 1 | 0,25 | 0,5 | 0,25 | 0,5 | 0,5 |
| 11 | 0 | 4 | 0 | 0 | 1 | 0 | 0,5 | 0,5 |
| 12-15 | 0 | 2 | 2 | 0 | 0,5 | 0,5 | 0,25 | 0,75 |
| 16 | 0 | 0 | 4 | 0 | 0 | 1 | 0 | 1 |

| $k$ | $T_{k,ss}^{(2)}$ | $T_{k,sw}^{(2)}$ | $T_{k,ww}^{(2)}$ | $P$ | $H$ | $Q$ | $p$ | $q$ |
|---|---|---|---|---|---|---|---|---|
| 1 | 24 | 0 | 0 | 1 | 0 | 0 | 1 | 0 |
| 2-5 | 13 | 10 | 1 | 0,542 | 0,417 | 0,042 | 0,75 | 0,25 |
| 6 | 6 | 12 | 6 | 0,25 | 0,5 | 0,25 | 0,5 | 0,5 |
| 7-10 | 5 | 14 | 5 | 0,208 | 0,584 | 0,208 | 0,5 | 0,5 |
| 11 | 6 | 12 | 6 | 0,25 | 0,5 | 0,25 | 0,5 | 0,5 |
| 12-15 | 1 | 10 | 13 | 0,042 | 0,417 | 0,542 | 0,25 | 0,75 |
| 16 | 0 | 0 | 24 | 0 | 0 | 1 | 0 | 1 |

| $k$ | $T_{k,ss}^{(3)}$ | $T_{k,sw}^{(3)}$ | $T_{k,ww}^{(3)}$ | $P$ | $H$ | $Q$ | $p$ | $q$ |
|---|---|---|---|---|---|---|---|---|
| 1 | 144 | 0 | 0 | 1 | 0 | 0 | 1 | 0 |
| 2-5 | 81 | 54 | 9 | 0,562 | 0,375 | 0,063 | 0,75 | 0,25 |
| 6 | 30 | 84 | 30 | 0,208 | 0,584 | 0,208 | 0,5 | 0,5 |
| 7-10 | 39 | 66 | 39 | 0,271 | 0,458 | 0,271 | 0,5 | 0,5 |
| 11 | 30 | 84 | 30 | 0,208 | 0,584 | 0,208 | 0,5 | 0,5 |
| 12-15 | 9 | 54 | 81 | 0,063 | 0,375 | 0,562 | 0,25 | 0,75 |
| 16 | 0 | 0 | 144 | 0 | 0 | 1 | 0 | 1 |

Fig. 10

| A | B | A ∨ B | A ∧ B | A → B | A | B | A ∨ B | A ∧ B | A → B |
|---|---|---|---|---|---|---|---|---|---|
| 1 | 1 | 1 | 1 | 1 | 0.5 | 0.25 | 0.5 | 0.25 | 0.25 |
| 1 | 0.75 | 1 | 0.75 | 0.75 | 0.5 | 0 | 0,5 | 0 | 0 |
| 1 | 0.5 | 1 | 0.5 | 0.5 | 0.25 | 1 | 1 | 0.25 | 1 |
| 1 | 0.25 | 1 | 0.25 | 0.25 | 0.25 | 0.75 | 0.75 | 0.25 | 1 |
| 1 | 0 | 1 | 0 | 0 | 0.25 | 0.5 | 0.5 | 0.25 | 1 |
| 0.75 | 1 | 1 | 0.75 | 1 | 0.25 | 0.25 | 0.25 | 0.25 | 1 |
| 0.75 | 0.75 | 0.75 | 0.75 | 1 | 0.25 | 0 | 0,25 | 0 | 0 |
| 0.75 | 0.5 | 0.75 | 0.5 | 0.5 | 0 | 1 | 1 | 0 | 1 |
| 0.75 | 0.25 | 0.75 | 0.25 | 0.25 | 0 | 0.75 | 0.75 | 0 | 1 |
| 0.75 | 0 | 0,75 | 0 | 0 | 0 | 0.5 | 0.5 | 0 | 1 |
| 0.5 | 1 | 1 | 0.5 | 1 | 0 | 0.25 | 0.25 | 0 | 1 |
| 0.5 | 0.75 | 0.75 | 0.5 | 1 | 0 | 0 | 0 | 0 | 1 |
| 0.5 | 0.5 | 0.5 | 0.5 | 1 | | | | | |

METHOD FOR OBJECT RECOGNITION

This application claims the priority of German patent document 10 2009 021785.1-53, filed May 18, 2009, the disclosure of which is expressly incorporated by reference herein.

TECHNICAL FIELD

The present invention relates to a method and system for recognition of an object that has a plurality of object characteristic expressions of abstract object characteristics, and is associated with an object characteristic class of a hierarchical system of object characteristic classes.

Every physical object has numerous characteristics. These may be surface characteristics, geometric characteristics, thermal characteristics, or acoustic characteristics, for example. These object characteristics may each have different expressions; for example, the thermal object characteristic may be hot or cold. As a result, an object may appear in multiple object characteristic expressions, referred to as "phenotypes," depending on the particular observation means used to detect the object. An observation means which reacts to radioactive radiation provides information about the object which is different from that provided by a camera which operates in visible light, or an infrared camera.

To identify an object reliably (i.e., with 100% certainty), it is therefore necessary to know and to detect all characteristics of the object and the possible expressions of the characteristics. An object may be identified with absolute accuracy only when the detected object characteristic expressions agree with the expressions of all object-specific characteristics which apply to this particular object. It is obviously impractical, if not impossible, to define in advance all conceivable expressions of all object characteristics in question so that these object characteristics may be subsequently compared to the result of an observation. Thus, for example, the remote control unit for a television may have any given geometric shape; therefore, an object cannot be identified as a remote control unit based on the expression of the object characteristic "geometric shape." This is more likely to be achieved by optical recognition of a possible keypad and recognition of the emission of infrared or electromagnetic radiation when the keypad is actuated. Using the simple logic of 100 percent recognition of all object characteristic expressions, i.e., in the present example, also the geometric shape, [recognition of] a remote control unit for a television would thus be possible only with an enormous level of effort for data collection.

SUMMARY OF THE INVENTION

One object of the present invention, therefore, is to provide a method for object recognition which allows reliable identification of an object, even if all object characteristics and their expressions are not known or detected.

This and other objects and advantages are achieved by the method according to the invention, which comprises the following steps:

1.1) Observation of at least one location at which the object is presumed to be present, using a plurality of sensors, each of which responds to at least one object characteristic and accordingly emits a sensor signal;
1.2) Checking whether each of the emitted sensor signals exceeds a specified threshold value for the sensor signals, and accepting sensor signals which exceed the threshold value;
1.3) Paired combination of the sensor characteristics for the accepted sensor signals obtained in step 1.2) to form identification characteristic pairs;
1.4) Comparing the population of identification characteristic pairs obtained in step 1.3) to object characteristic classes stored in a first memory; and
1.5) Determining the object, based on the object characteristic class, whose object characteristic pairs are identical to the identification characteristic pairs obtained in step 1.3).

ADVANTAGES

As a result of the formation according to the invention of identification characteristic pairs from the sensor signals ascertained during observation of an object, and comparison of these identification characteristic pairs to object characteristic classes which are typical of the object, an object may be identified with a high level of probability when a sufficient number of different sensor signals generated by the object have been detected. This probability may be increased by increasing the number of sensors observing the object and/or by adding contextual knowledge.

Step 1.3 is preferably carried out according to the rules of Mendelian genetics, whereby in step 1.3 the number of identification characteristic pairs in each collection corresponds to a value of 2n, where $n\mu 1$, and to achieve this condition, doublets of identification characteristic pairs determined multiple times are initially omitted. If the condition still cannot be satisfied, identification characteristic pairs which are already present are multiplied until the condition is satisfied.

The at least one location in step 1.1 is preferably observed by scanning a region in which the object is presumed to be present. This preliminary estimation speeds up the process of object recognition.

The following additional steps are preferably carried out after step 1.2:

1.2.1) Detecting location coordinates for each accepted sensor signal;
1.2.2) Associating the location coordinates with the accepted sensor signal; and
1.2.3) Storing the accepted sensor signals together with the associated location coordinates in a second data storage system.

This preferred procedure allows the object to be observed using different sensors at different points in time, and then to associate the obtained sensor signals with the object, provided that the object is stationary.

It is further preferred that a time signal which represents the point in time that the sensor signal was detected is associated with each accepted sensor signal, and the accepted sensor signals together with the respective associated time signals are stored in a second data storage system. As a result of this time signal detection it is also possible to identify moving objects, even when the object is observed using different sensors at different points in time. Reliable position location of moving objects may be carried out in particular when the time signal and the location coordinates of the object are detected.

In another preferred embodiment, the plurality of sensors includes at least one sensor which, in addition to a sensor already present, responds to the same object characteristic. This additional sensor emits a sensor signal which likewise is accepted for further processing only when it exceeds a specified threshold value. In this manner greater significance and higher weighting may be assigned to this object characteristic in the object identification.

The observation of the at least one location in step 1.1) by different sensors is preferably carried out by at least a portion of the sensors at different points in time, and steps 1.3) and 1.4) are carried out when all sensors have observed the location. Thus, all investigation results are first collected, from which the identification characteristic pairs are formed, and this population is then compared to the stored object characteristic classes.

Preferably, the observation of the location in step 1.1) by different sensors is carried out multiple times in succession by at least a portion of the sensors, and step 1.3) is run through for the population of observations carried out. The identification characteristic pairs determined from the population of observations carried out are combined according to the rules of Mendelian genetics to form a collection of identification characteristic pairs, the number of the identification characteristic pairs in each collection corresponding to a value of $2^n$, where $n \mu 1$. To achieve this condition, in combining the determined identification characteristic pairs, multiply determined identification characteristic pairs are initially accepted into the collection only once, and if the condition still cannot be satisfied, identification characteristic pairs which are already present are multiplied until this condition is satisfied. The identification characteristic pairs combined in the collection are then compared to the stored object characteristic pairs. This multiple observation of the object by at least one sensor likewise increases the reliability of the identification characteristic pairs in forming an object characteristic class, and thus increases the probability of identification.

When the sensor characteristics are combined in step 1.3), doublets of multiply present identification characteristic pairs are preferably not considered, and for this purpose the sequence of identification characteristics in an identification characteristic pair remains not considered. This means, for example, that for a combination of characteristics R and G, the resulting characteristic pairs "RG" and "GR" are considered to be equal, and only one of these two characteristic pairs is accepted into the population of the identification characteristic pairs.

The hierarchical object characteristic classes are also preferably formed by classifying the object characteristic pairs formed from the object characteristics.

Here as well, the number of object characteristic pairs in an object characteristic class preferably corresponds to a value of $2^n$, where $n \mu 1$. To achieve this condition, in the classification of the object characteristic pairs, doublets of multiply present identification characteristic pairs are initially not considered, and the sequence of identification characteristics in an identification characteristic pair remains not considered. If the condition still cannot be satisfied, identification characteristic pairs which are already present are multiplied until this condition is satisfied. Thus, for example, the characteristic pair "rg" is considered to be equal to the characteristic pair "gr," and only one of the two is accepted into the corresponding object characteristic class.

Accordingly, the object characteristics are classified by inheritance of characteristics according to the rules of Mendelian genetics. The object characteristic pairs are used to determine the Hardy-Weinberg type, which specifies the inheritance class and thus the object characteristic class. The same procedure is preferably carried out in forming the population of the identification characteristic pairs in step 1.3).

Other objects, advantages and novel features of the present invention will become apparent from the following detailed description of the invention when considered in conjunction with the accompanying drawings.

BRIEF DESCRIPTION OF THE DRAWINGS

The drawings show the following:

FIG. 3 shows the possible parental combinations for two traits;

FIG. 4 shows the phenotypic and allelic ratios for two traits;

FIG. 5 shows the phenotype classes within the Mendelian classification for three traits;

FIG. 6 shows multidimensional polymorphisms;

FIG. 7 shows the phenotypic evolution and divergence;

FIG. 8 shows the loss of entropy as the result of phenotypic selection;

FIG. 9 shows the inheritance of statistical equilibrium;

FIG. 10 is a truth table for AND and OR operations and implication;

DETAILED DESCRIPTION OF THE PREFERRED EXEMPLARY EMBODIMENTS

The method and system according to the invention is based not on conventional quantifier logic or neuronal networks, but rather on the principle of the inheritance of characteristics. For inheritance in nature, a decision is not made solely according to the categories "good" and "bad"; instead, nature makes compromises. Based on the Mendelian rules of genetics, the method according to the invention is capable of making more accurate decisions from "generation" to "generation."

In nature, every gene is the product of fused DNA information from both parents. However, genes which correspond to one another but which are not always identical determine the differences with regard to the traits of an organism, the so-called phenotype. Similarly as for inheritance in nature, any given object traits having different expressions may be phenotyped, regardless of the origin of the information. As an example, a traveling armored vehicle will be considered. The radar reflection characteristics and the heat radiated from the vehicle are different expressions of the same object, namely, the traveling armored vehicle. The armor is always metallic, so that the radar reflection characteristics are inherited as a dominant trait. However, an armored vehicle is still an armored vehicle even when it is not in motion, and therefore is not heated because the internal combustion engine is not running. Therefore, the radiation of infrared energy is a characteristic of the armored vehicle which is inherited as a recessive trait. Thus, an armored vehicle with these characteristics has two phenotypes: the armored vehicle at rest, and the armored vehicle in motion.

In the method for object recognition according to the invention, the identification characteristic pairs are formed from the individual observations carried out by the sensors, and the population of the identification characteristic pairs is compared to stored object characteristic classes. The rules of Mendelian genetics are preferably applied in this procedure. Therefore, for a better understanding of the present invention the principles of Mendelian genetics are first described.

Explanation of the Inheritance Principle

Every gene is the product of fused DNA information from both parents. However, genes which correspond to one another but which are not always identical determine the differences with regard to the traits of an organism, the so-called phenotype. Similarly as for inheritance, any given object traits having different expressions may be phenotyped, regardless of the origin of the information.

Figure 1:
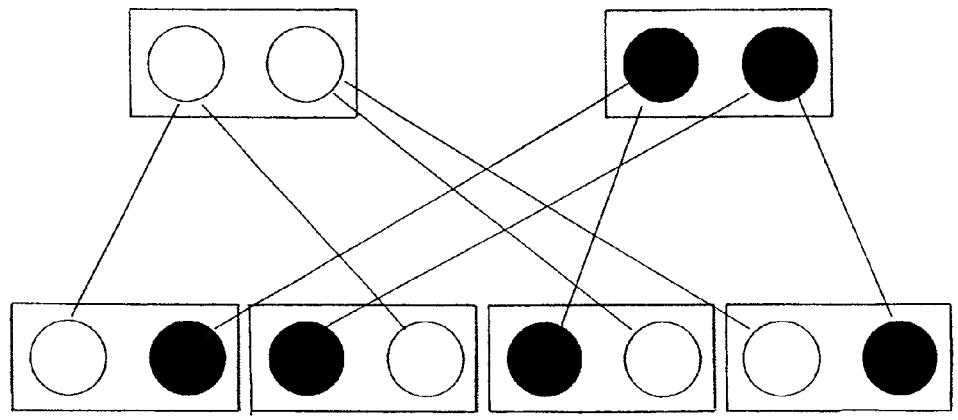
FIG. 1 is an inheritance diagram for two traits s and w.

FIG. 1 shows an inheritance diagram for two traits, s (black) and w (white). Each trait may be inherited twice, regardless of the number of expressions in which it is present, resulting in a total of four different possibilities. Similar traits are referred to as "homozygous," and mixed traits are referred to as "heterozygous."

Figure 2:
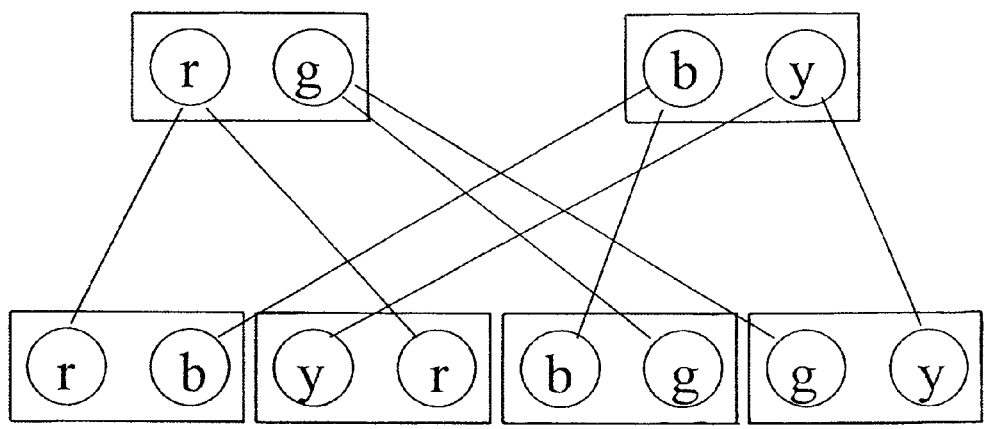
FIG. 2 is the polymorphic inheritance diagram for four traits r, g, b, and y.

FIG. 2 shows the polymorphic inheritance diagram for four traits r, g, b, and y. In the present case, the letters r, g, b, and y stand for the colors red (r), green (g), blue (b), and yellow (y).

A Statistical Model of Inheritance

Let $E=\{e_{1111}, \ldots e_{ijkl}, \ldots e_{mmmm}\}$ be an event having m traits, i.e., $m^4$ elements in the parental generation F0. For each trait combination ijkl the following is valid: $1 \leq i,j,k,l \leq m$. For the allelic ratio $(i_1):(i_2): \ldots :(i_m)$, where $i_1, i_2, \ldots, i_m \in \{0,1,2,3,4\}$ stand for natural numbers, the auxiliary condition: $i_1+i_2+\ldots+i_m=4$ applies (Mendelian condition). FIG. 3 illustrates the number of possible elementary events for two traits (black and white). Thus, FIG. 3 shows the possible parental combinations for two traits.

In this regard, the five allowed allelic ratios are 4:0, 3:1, 2:2, 1:3, and 0:4. From these, sixteen different Mendelian types, denoted below by the symbol T for short, result in the filial (F1) generation.

For three traits, a total of 81 possible sets of parents results, which may be subdivided into 21 Mendelian classes and classified according to 15 different allelic ratios.

Solution of the Mendelian Equations

In each inheritance step, in each case six Mendelian types of the nth generation are added to give a Mendelian type of the (n+1)th generation; for example, the following expression is valid for Mendelian type 4 in the second generation: $T_4^{(2)} = T_1^{(1)}+2T_2^{(1)}+2T_3^{(1)}+T_8^{(1)}$.

If the polymorphism consists of only two traits, the following 16 inheritance equations are obtained:

$T_1^{(n+1)} = 6T_1^{(n)}$;

$T_2^{(n+1)} = T_1^{(n)}+2T_2^{(n)}+T_3^{(n)}+T_5^{(n)}+T_9^{(n)}$;

$T_3^{(n+1)} = T_1^{(n)}+T_3^{(n)}+2T_4^{(n)}+T_5^{(n)}+T_8^{(n)}$;

$T_4^{(n+1)} = T_1^{(n)}+2T_2^{(n)}+2T_3^{(n)}+T_8^{(n)}$;

$T_5^{(n+1)} = T_1^{(n)}+2T_4^{(n)}+2T_5^{(n)}+T_9^{(n)}$;

$T_6^{(n+1)} = T_7^{(n)}+2T_8^{(n)}+2T_9^{(n)}+T_{10}^{(n)}$;

$T_7^{(n+1)} = T_2^{(n)}+T_3^{(n)}+T_6^{(n)}+T_9^{(n)}+T_{12}^{(n)}+T_{13}^{(n)}$;

$T_8^{(n+1)} = T_3^{(n)}+T_4^{(n)}+T_6^{(n)}+T_8^{(n)}+T_{12}^{(n)}+T_{15}^{(n)}$;

$T_9^{(n+1)} = T_2^{(n)}+T_5^{(n)}+T_9^{(n)}+T_{11}^{(n)}T_{13}^{(n)}+T_{14}^{(n)}$;

$T_{10}^{(n+1)} = T_4^{(n)}+T_5^{(n)}+T_8^{(n)}+T_{11}^{(n)}+T_{14}^{(n)}+T_{15}^{(n)}$;

$T_{11}^{(n+1)} = T_7^{(n)}+2T_8^{(n)}+2T_9^{(n)}+T_{10}^{(n)}$;

$T_{12}^{(n+1)} = T_8^{(n)}+2T_{12}^{(n)}+2T_{13}^{(n)}+T_{16}^{(n)}$;

$T_{13}^{(n+1)} = T_9^{(n)}+2T_{14}^{(n)}+2T_{15}^{(n)}+T_{16}^{(n)}$;

$T_{14}^{(n+1)} = T_9^{(n)}+T_{12}^{(n)}+T_{14}^{(n)}2T_{15}^{(n)}+T_{16}^{(n)}$;

$T_{15}^{(n+1)} = T_8^{(n)}+T_{12}^{(n)}+T_{14}^{(n)}+2T_{15}^{(n)}+T_{16}^{(n)}$;

$T_{16}^{(n+1)} = 6T_{16}^{(n)}$.

For better clarity, these recurrence equations may be represented in matrix format:

$$\begin{pmatrix} T_1^{(n+1)} \\ T_2^{(n+1)} \\ T_3^{(n+1)} \\ T_4^{(n+1)} \\ T_5^{(n+1)} \\ T_6^{(n+1)} \\ T_7^{(n+1)} \\ T_8^{(n+1)} \\ T_9^{(n+1)} \\ T_{10}^{(n+1)} \\ T_{11}^{(n+1)} \\ T_{12}^{(n+1)} \\ T_{13}^{(n+1)} \\ T_{14}^{(n+1)} \\ T_{15}^{(n+1)} \\ T_{16}^{(n+1)} \end{pmatrix} = \begin{pmatrix} 6 & 0 & 0 & 0 & 0 & 0 & 0 & 0 & 0 & 0 & 0 & 0 & 0 & 0 & 0 & 0 \\ 1 & 2 & 1 & 0 & 1 & 0 & 0 & 0 & 1 & 0 & 0 & 0 & 0 & 0 & 0 & 0 \\ 1 & 0 & 1 & 2 & 1 & 0 & 0 & 1 & 0 & 0 & 0 & 0 & 0 & 0 & 0 & 0 \\ 1 & 2 & 2 & 0 & 0 & 0 & 0 & 1 & 0 & 0 & 0 & 0 & 0 & 0 & 0 & 0 \\ 1 & 0 & 0 & 2 & 2 & 0 & 0 & 0 & 1 & 0 & 0 & 0 & 0 & 0 & 0 & 0 \\ 0 & 0 & 0 & 0 & 0 & 0 & 1 & 2 & 2 & 1 & 0 & 0 & 0 & 0 & 0 & 0 \\ 0 & 1 & 1 & 0 & 0 & 1 & 0 & 0 & 1 & 0 & 0 & 1 & 1 & 0 & 0 & 0 \\ 0 & 0 & 1 & 1 & 0 & 1 & 0 & 1 & 0 & 0 & 0 & 1 & 0 & 0 & 1 & 0 \\ 0 & 1 & 0 & 0 & 1 & 0 & 0 & 0 & 1 & 0 & 1 & 0 & 1 & 1 & 0 & 0 \\ 0 & 0 & 0 & 1 & 1 & 0 & 0 & 1 & 0 & 0 & 1 & 0 & 0 & 1 & 1 & 0 \\ 0 & 0 & 0 & 0 & 0 & 0 & 1 & 2 & 2 & 1 & 0 & 0 & 0 & 0 & 0 & 0 \\ 0 & 0 & 0 & 0 & 0 & 0 & 0 & 1 & 0 & 0 & 0 & 2 & 2 & 0 & 0 & 1 \\ 0 & 0 & 0 & 0 & 0 & 0 & 0 & 0 & 1 & 0 & 0 & 0 & 2 & 2 & 1 & 1 \\ 0 & 0 & 0 & 0 & 0 & 0 & 0 & 1 & 0 & 0 & 1 & 2 & 1 & 0 & 1 & 1 \\ 0 & 0 & 0 & 0 & 0 & 0 & 1 & 0 & 0 & 0 & 1 & 0 & 1 & 2 & 1 & 1 \\ 0 & 0 & 0 & 0 & 0 & 0 & 0 & 0 & 0 & 0 & 0 & 0 & 0 & 0 & 0 & 6 \end{pmatrix} \begin{pmatrix} T_1^{(n)} \\ T_2^{(n)} \\ T_3^{(n)} \\ T_4^{(n)} \\ T_5^{(n)} \\ T_6^{(n)} \\ T_7^{(n)} \\ T_8^{(n)} \\ T_9^{(n)} \\ T_{10}^{(n)} \\ T_{11}^{(n)} \\ T_{12}^{(n)} \\ T_{13}^{(n)} \\ T_{14}^{(n)} \\ T_{15}^{(n)} \\ T_{16}^{(n)} \end{pmatrix} \quad (1)$$

This may be written in abbreviated vector notation as follows:

$$T^{(n+1)} = VT^{(n)}, \quad (2)$$

where $T^{(n)} = (T_1^{(n)}, \ldots, T_{16}^{(n)})^T$ stands for the Mendelian operator of the nth generation $n \geq 1$, and V stands for the inheritance matrix.

The coefficients of the Mendelian operator of the first (filial) generation may be represented in tensor notation as follows:

$$T_k^{(1)} = \sum_{i=1}^{m} \sum_{j=1}^{m} T_{ijk} \langle s_i | s_j \rangle \quad k \in \{1, \ldots, m^4\} \quad (3)$$

where m is the number of traits $s_i$, and $T_{ijk}$ stands for constant coefficients of the trait combinations $s_i s_j$. If m=2 is selected, and the alleles are defined by orthogonal vectors $s_1 \equiv s$ and $s_2 \equiv w$, the following sixfold degenerated set of initial conditions is obtained:

$$
\begin{aligned}
T_1^{(1)} &= 4ss & T_9^{(1)} &= sw + ws + ww \\
T_2^{(1)} &= 2ss + sw + ws & T_{10}^{(1)} &= sw + ws + ww \\
T_3^{(1)} &= 2ss + sw + ws & T_{11}^{(1)} &= 2sw + 2ws \\
T_4^{(1)} &= 2ss + sw + ws & T_{12}^{(1)} &= sw + ws + 2ww \\
T_5^{(1)} &= 2ss + sw + ws & T_{13}^{(1)} &= sw + ws + 2ww \\
T_6^{(1)} &= 2sw + 2ws & T_{14}^{(1)} &= sw + ws + 2ww \\
T_7^{(1)} &= sw + ws + ww & T_{15}^{(1)} &= sw + ws + 2ww \\
T_8^{(1)} &= sw + ws + ww & T_{16}^{(1)} &= 4ww
\end{aligned}
\quad (4)
$$

setting $ss \equiv \langle s|s \rangle$, $sw \equiv \langle s|w \rangle$, $ws \equiv \langle w|s \rangle$ and $ww \equiv \langle w|w \rangle$, and using the linear combination $$T_k^{(n)} | s_i \rangle = \sum_{j=1}^{m} T_{ijk} | s_j \rangle \quad (5)$$

with the normalization condition $$\sum_{i=1}^{m} \langle s_i | s_i \rangle = 1.$$

The sum of all linear combinations of a generation conforms to the following principle:

$$T_k^{(n)} = \sum_{i=1}^{m} \langle s_i | T_k^{(n)} s_i \rangle = 4 \cdot 6^{n-1} \; \forall \, k \in \{1, \ldots, m^4\} m \in N \quad (6)$$

That is, in the nth generation the number of genotypes is four times 6 to the (n−1)th power.

In the present bimorphism, the 16-dimensional Mendelian operator of the nth generation may in each case be factorized into four base vectors:

$$T^{(n)} = T_{SS}^{(n)} + T_{SW}^{(n)} + T_{WS}^{(n)} + T_{WW}^{(n)} \quad (7)$$

For the first generation the factorization is as follows:

$T_{SS}^{(1)} = (4,2,2,2,2,0,1,1,1,0,0,0,0,0,0,0)^T$ $T_{SW}^{(1)} = (0,1,1,1,1,2,1,1,1,1,2,1,1,1,1,0)^T$ $T_{WS}^{(1)} = (0,1,1,1,1,2,1,1,1,1,2,1,1,1,1,0)^T$ $T_{WW}^{(1)} = (0,0,0,0,0,0,1,1,1,0,2,2,2,2,2,4)^T \quad (8)$ Insertion of these base vectors into the above recurrence equation results in the base vectors of the second generation:

$$
\begin{pmatrix} T_1^{(2)} \\ T_2^{(2)} \\ T_3^{(2)} \\ T_4^{(2)} \\ T_5^{(2)} \\ T_6^{(2)} \\ T_7^{(2)} \\ T_8^{(2)} \\ T_9^{(2)} \\ T_{10}^{(2)} \\ T_{11}^{(2)} \\ T_{12}^{(2)} \\ T_{13}^{(2)} \\ T_{14}^{(2)} \\ T_{15}^{(2)} \\ T_{16}^{(2)} \end{pmatrix}
=
\begin{pmatrix}
6 & 0 & 0 & 0 & 0 & 0 & 0 & 0 & 0 & 0 & 0 & 0 & 0 & 0 & 0 & 0 \\
1 & 2 & 1 & 0 & 1 & 0 & 0 & 1 & 0 & 0 & 0 & 0 & 0 & 0 & 0 & 0 \\
1 & 0 & 1 & 2 & 1 & 0 & 0 & 1 & 0 & 0 & 0 & 0 & 0 & 0 & 0 & 0 \\
1 & 2 & 2 & 0 & 0 & 0 & 1 & 0 & 0 & 0 & 0 & 0 & 0 & 0 & 0 & 0 \\
1 & 0 & 0 & 2 & 2 & 0 & 0 & 1 & 0 & 0 & 0 & 0 & 0 & 0 & 0 & 0 \\
0 & 0 & 0 & 0 & 0 & 1 & 2 & 2 & 1 & 0 & 0 & 0 & 0 & 0 & 0 & 0 \\
0 & 1 & 1 & 0 & 0 & 1 & 0 & 0 & 1 & 0 & 0 & 1 & 1 & 0 & 0 & 0 \\
0 & 0 & 1 & 1 & 0 & 1 & 0 & 1 & 0 & 0 & 0 & 1 & 0 & 0 & 1 & 0 \\
0 & 1 & 0 & 0 & 1 & 0 & 0 & 0 & 1 & 0 & 1 & 0 & 1 & 1 & 0 & 0 \\
0 & 0 & 0 & 1 & 1 & 0 & 0 & 1 & 0 & 0 & 1 & 0 & 0 & 1 & 1 & 0 \\
0 & 0 & 0 & 0 & 0 & 0 & 1 & 2 & 2 & 1 & 0 & 0 & 0 & 0 & 0 & 0 \\
0 & 0 & 0 & 0 & 0 & 0 & 0 & 1 & 0 & 0 & 0 & 2 & 2 & 0 & 0 & 1 \\
0 & 0 & 0 & 0 & 0 & 0 & 0 & 0 & 1 & 0 & 0 & 0 & 0 & 2 & 2 & 1 \\
0 & 0 & 0 & 0 & 0 & 0 & 0 & 1 & 0 & 0 & 1 & 2 & 1 & 0 & 1 & 0 \\
0 & 0 & 0 & 0 & 0 & 0 & 1 & 0 & 0 & 0 & 1 & 0 & 1 & 2 & 1 & 0 \\
0 & 0 & 0 & 0 & 0 & 0 & 0 & 0 & 0 & 0 & 0 & 0 & 0 & 0 & 0 & 6
\end{pmatrix}
\begin{pmatrix} 4 \\ 2 \\ 2 \\ 2 \\ 2 \\ 0 \\ 1 \\ 1 \\ 1 \\ 1 \\ 0 \\ 0 \\ 0 \\ 0 \\ 0 \\ 0 \end{pmatrix}
+ \ldots
=
\begin{pmatrix} 24 \\ 13 \\ 13 \\ 13 \\ 13 \\ 6 \\ 5 \\ 5 \\ 5 \\ 5 \\ 6 \\ 1 \\ 1 \\ 1 \\ 1 \\ 0 \end{pmatrix}
+ 2
\begin{pmatrix} 0 \\ 5 \\ 5 \\ 5 \\ 5 \\ 6 \\ 7 \\ 7 \\ 7 \\ 7 \\ 6 \\ 5 \\ 5 \\ 5 \\ 5 \\ 0 \end{pmatrix}
+
\begin{pmatrix} 0 \\ 1 \\ 1 \\ 1 \\ 1 \\ 6 \\ 5 \\ 5 \\ 5 \\ 5 \\ 6 \\ 13 \\ 13 \\ 13 \\ 13 \\ 24 \end{pmatrix}
$$

The factorization into base vectors for the second generation is as follows:

$$\begin{vmatrix} T_{ss}^{(2)} = (24, 13, 13, 13, 13, 6, 5, 5, 5, 5, 6, 1, 1, 1, 1, 0)^T \\ T_{sw}^{(2)} = (0, 5, 5, 5, 5, 6, 7, 7, 7, 7, 6, 5, 5, 5, 5, 0)^T \\ T_{ws}^{(2)} = (0, 5, 5, 5, 5, 6, 7, 7, 7, 7, 6, 5, 5, 5, 5, 0)^T \\ T_{ww}^{(2)} = (0, 1, 1, 1, 1, 6, 5, 5, 5, 5, 6, 13, 13, 13, 13, 24)^T \end{vmatrix} \quad (9)$$

This same procedure is continued, so that the base vectors of the third generation result from inserting the base vectors of the second generation into the recurrence equation:

$$\begin{pmatrix} T_1^{(3)} \\ T_2^{(3)} \\ T_3^{(3)} \\ T_4^{(3)} \\ T_5^{(3)} \\ T_6^{(3)} \\ T_7^{(3)} \\ T_8^{(3)} \\ T_9^{(3)} \\ T_{10}^{(3)} \\ T_{11}^{(3)} \\ T_{12}^{(3)} \\ T_{13}^{(3)} \\ T_{14}^{(3)} \\ T_{15}^{(3)} \\ T_{16}^{(3)} \end{pmatrix} = \begin{pmatrix} 6 & 0 & 0 & 0 & 0 & 0 & 0 & 0 & 0 & 0 & 0 & 0 & 0 & 0 & 0 & 0 \\ 1 & 2 & 1 & 0 & 1 & 0 & 0 & 0 & 1 & 0 & 0 & 0 & 0 & 0 & 0 & 0 \\ 1 & 0 & 1 & 2 & 1 & 0 & 0 & 1 & 0 & 0 & 0 & 0 & 0 & 0 & 0 & 0 \\ 1 & 2 & 2 & 0 & 0 & 0 & 1 & 0 & 0 & 0 & 0 & 0 & 0 & 0 & 0 & 0 \\ 1 & 0 & 0 & 2 & 2 & 0 & 0 & 0 & 1 & 0 & 0 & 0 & 0 & 0 & 0 & 0 \\ 0 & 0 & 0 & 0 & 0 & 1 & 2 & 2 & 1 & 0 & 0 & 0 & 0 & 0 & 0 & 0 \\ 0 & 1 & 1 & 0 & 0 & 1 & 0 & 0 & 1 & 0 & 0 & 1 & 1 & 0 & 0 & 0 \\ 0 & 0 & 1 & 1 & 0 & 1 & 0 & 1 & 0 & 0 & 0 & 1 & 0 & 0 & 1 & 0 \\ 0 & 1 & 0 & 0 & 1 & 0 & 0 & 0 & 1 & 0 & 1 & 0 & 1 & 1 & 0 & 0 \\ 0 & 0 & 0 & 1 & 1 & 0 & 0 & 1 & 0 & 0 & 1 & 0 & 0 & 1 & 1 & 0 \\ 0 & 0 & 0 & 0 & 0 & 0 & 1 & 2 & 2 & 1 & 0 & 0 & 0 & 0 & 0 & 0 \\ 0 & 0 & 0 & 0 & 0 & 0 & 0 & 1 & 0 & 0 & 0 & 2 & 2 & 0 & 0 & 1 \\ 0 & 0 & 0 & 0 & 0 & 0 & 0 & 0 & 1 & 0 & 0 & 0 & 0 & 2 & 2 & 1 \\ 0 & 0 & 0 & 0 & 0 & 0 & 0 & 1 & 0 & 0 & 1 & 2 & 1 & 0 & 0 & 1 \\ 0 & 0 & 0 & 0 & 0 & 0 & 0 & 1 & 0 & 0 & 0 & 1 & 0 & 1 & 2 & 1 \\ 0 & 0 & 0 & 0 & 0 & 0 & 0 & 0 & 0 & 0 & 0 & 0 & 0 & 0 & 0 & 6 \end{pmatrix} \begin{pmatrix} 24 \\ 13 \\ 13 \\ 13 \\ 13 \\ 6 \\ 5 \\ 5 \\ 5 \\ 5 \\ 6 \\ 1 \\ 1 \\ 1 \\ 1 \\ 0 \end{pmatrix} + \ldots = \begin{pmatrix} 144 \\ 81 \\ 81 \\ 81 \\ 81 \\ 30 \\ 39 \\ 39 \\ 39 \\ 39 \\ 30 \\ 9 \\ 9 \\ 9 \\ 9 \\ 0 \end{pmatrix} + 2 \begin{pmatrix} 0 \\ 27 \\ 27 \\ 27 \\ 27 \\ 42 \\ 33 \\ 33 \\ 33 \\ 33 \\ 42 \\ 27 \\ 27 \\ 27 \\ 27 \\ 0 \end{pmatrix} + \begin{pmatrix} 0 \\ 9 \\ 9 \\ 9 \\ 9 \\ 30 \\ 39 \\ 39 \\ 39 \\ 39 \\ 30 \\ 81 \\ 81 \\ 81 \\ 81 \\ 144 \end{pmatrix}$$

where $$T_{ss}^{(33)} = (144, 81, 81, 81, 81, 30, 39, 39, 39, 39, 30, 9, 9, 9, 9, 0)^T \quad (10)$$
$$T_{sw}^{(3)} = (0, 27, 27, 27, 27, 42, 33, 33, 33, 33, 42, 27, 27, 27, 27, 0)^T$$
$$T_{ws}^{(3)} = (0, 27, 27, 27, 27, 42, 33, 33, 33, 33, 42, 27, 27, 27, 27, 0)^T$$
$$T_{ww}^{(3)} = (0, 9, 9, 9, 9, 30, 39, 39, 39, 39, 30, 81, 81, 81, 81, 144)^T$$

Degeneration of the Solutions of a Polymorphism

Based on a coefficient comparison it may be seen that the following Mendelian types are identical:

$$T_1^{(1)} = 4ss$$

$$T_2^{(1)} = T_3^{(1)} = T_4^{(1)} = T_5^{(1)} = 2ss + sw + ws$$

$$T_6^{(1)} = T_{11}^{(1)} = 2sw + 2ws$$

$$T_7^{(1)} = T_8^{(1)} = T_9^{(1)} = T_{10}^{(1)} = ss + sw + ws + ww$$

$$T_{12}^{(1)} = T_{13}^{(1)} = T_{14}^{(1)} = T_{15}^{(1)} = sw + ws + 2ww$$

$$T_{16}^{(1)} = 4ww \qquad (11)$$

Degeneration of the solutions allows the 16 Mendelian types to be subdivided into six different phenotype classes. Depending on the degree of polymorphism, the number of possible classes increases with the number of object traits.

The Mendelian Phenotype Classification

The class subdivision of a polymorphism is linked to the allowable phenotype combinations. Since the number of degenerations is always greater than the number of allellic ratios allowed under the Mendelian condition, a given allellic ratio may occur in multiple Mendelian inheritance classes; therefore, the assignment is not unique. Thus, for example, the allellic ratio 2:2 of a bimorphism appears in class 3 as well as in class 4 (see FIG. 4), once as a heterozygous phenotype combination, and once in a combination of homozygous and heterozygous phenotypes. Within a total population, without altering the allellic ratio a class change in the successive generation may be made only between equivalent phenotype classes. The table in FIG. 4 shows the phenotypic and allellic ratios for two traits.

The ratio of the number of Mendelian phenotype classes to the number of possible allele combinations changes as the number of traits increases, at the expense of the allele classes; i.e., for three traits there are six allellic ratios, each belonging to two equivalent phenotype classes (see FIG. 5). The table in FIG. 5 shows the phenotype classes within the Mendelian classification for three traits.

The table in FIG. 6 shows multidimensional polymorphisms. The relevant variables, i.e., the number of genotypes and phenotypes, the homozygotes and heterozygotes, and the number of possible Mendelian inheritance types and phenotype classes for a given number of traits are shown. Mathematically, the number of phenotypes is equal to the sum of homozygotes and heterozygotes. The number of genotypes is obtained from the number of homozygotes and twice the number of heterozygotes. The number of sets of parents is a quadratic function of the number of genotypes, and the number of genotypes is a quadratic function of the number of homozygotes.

All classes of the next lower polymorphism of the mth degree are completely contained in the phenotype classes of the next higher polymorphism of the (m+1)th degree. Even if the same allellic ratio is present in a generation despite different phenotypes, a more refined differentiation may be made by taking the associated Mendelian class into account.

Phenotype Evolution and Loss of Entropy

The discussion of the phenotypic divergence will be limited to polymorphism of the second degree. In the table in FIG. 7, the scalar products of the base vectors associated with the Mendelian operator for all possible phenotypes for the respective first class representative (Mendelian types 1, 2, 6, 7, 12, and 16) have been computed for the first nine generations, and for clarity are presented using the digit sum formed according to the above formula.

In the total absence of selection, the phenotypic divergence results in extinction of the heterozygotes, whereas the homozygotes for both expressions assume their maximum frequencies; i.e., the order in the system is progressively increased by the inheritance from generation to generation, so that in the approximation for an infinite number of generations only homozygous phenotypes, i.e., orthogonal states, survive. If selection is also active, only the homozygous pure form of the favored trait ultimately survives; i.e., the entropy decreases in all possible cases. In nature, in the majority of cases the heterozygotes are preferred when a favorable trait is correlated with an unfavorable trait, so that the advantages and disadvantages cancel one another out. In this case the entropy increases. For commercial use of this principle the increase in entropy may be avoided, thus always resulting in order.

The summed scalar products from the table in FIG. 7 are now expressed as relative frequencies or probabilities by normalizing to the total population. For this purpose, several new terms are introduced below, initially only for the example of two traits.

| Probability   | Meaning                              |
|---------------|--------------------------------------|
| P             | Relative frequency of phenotype ss   |
| H             | Relative frequency of phenotype sw   |
| Q             | Relative frequency of phenotype ww   |
| P + Q + H = 1 | Normalization condition              |
| P             | Relative frequency of s allele       |
| Q             | Relative frequency of w allele       |
| p + q = 1     | Normalization condition              |

The numbers p and q are referred to as Hardy-Weinberg coefficients. These numbers stand for the relative frequency of the two alleles s and w.

The result of the normalization is provided in the table in FIG. 8. This table shows the loss of entropy as the result of phenotype selection, the indices referring to the respective first Mendelian type of phenotype classification.

In the absence of selection, the Hardy-Weinberg coefficients p and q in a statistical population remain constant, independent of the generation, and the statistical equilibrium of the alleles is not upset (see the table in FIG. 9, which shows the inheritance of statistical equilibrium). It may also be seen that the sum of the Hardy-Weinberg coefficients conforms to a certain logic which is continued in higher dimensions. The logic system is characterized by quarter-increment truth values, where zero has no truth value. Due to the particular importance of the number 5, the logic upon which the inheritance is based is referred to as "pentalogic," in contrast to binary logic, in which the number 2 plays the key role.

For an understanding of the principles on which inheritance is based in the general case, it is necessary to introduce so-called Hardy-Weinberg logic.

Hardy-Weinberg Logic

Standard Aristotelian logic is contradictory to everyday experience. We make judgments not on the basis of "absolutely true" and "absolutely false," but, rather, on the basis of "very likely" or "unlikely." Total certainty does not exist, since nothing can actually be proven. Actual events have a Gaussian or normal distribution, and absolute truth corresponds only to an idealized assumption. Likewise, chance cannot be predicted. Examples from the real world are Heisenberg's uncertainty principle and radioactive decay. Insistence on 100% truth frequently results in the inability to make a decision. Decisions are simplified only by giving up the claim to absoluteness. The same principle of uncertainty has also been implemented by nature in inheritance. The genetic information of descendants can be specified by the parents only with a certain probability, which is subject to Mendelian laws.

Hardy-Weinberg logic is referred to as "fuzzy logic." Regardless of the number of traits to be inherited, there are always five possible decisions:

| Truth value | Verbal equivalent |
|---|---|
| 1 | Yes (true) |
| 0.75 | Likely (probably yes) |
| 0.5 | Possible (indifferent, undecided) |
| 0.25 | Unlikely (probably no) |
| 0 | No (false) |

The sum of all possible decisions, the same as for standard logic, is always less than or equal to 1. All logical operations which apply in standard logic may be transferred to Hardy-Weinberg logic. The results of the logical AND and OR operations as well as the implication are provided in the table in FIG. 10.

The duality and complementarity principles of Hardy-Weinberg logic apply in exactly the same manner:

$\neg 1 = 0 \qquad 1 \wedge \neg 1 = 0 \qquad 1 \vee \neg 1 = 1$ $\neg 0.75 = 0.25 \qquad .075 \wedge \neg 0.75 = 0.25 \qquad 0.75 \vee \neg 0.75 = 0.75$ $\neg 0.5 = 0.5 \qquad 0.5 \wedge \neg 0.5 = 0.5 \qquad 0.5 \vee \neg 0.5 = 0.5$ $\neg 0.25 = 0.75 \qquad 0.25 \wedge \neg 0.25 = 0.25 \qquad 0.25 \vee \neg 0.25 = 0.25$ $\neg 0 = 1 \qquad 0 \wedge \neg 0 = 0 \qquad 0 \vee \neg 0 = 1$ Standard binary logic and Hardy-Weinberg pentalogic are compared to one another in the following table. For two traits there are exactly five combination possibilities:

| Binary logic $p + q = 1$ | Pentalogic $p + q = 1$ |
|---|---|
| (1) $1 + 0 = 1$ | (1) $1 + 0 = 1$ |
| (2) $0 + 1 = 1$ | (2) $0.75 + 0.25 = 1$ |
| | (3) $0.5 + 0.5 = 1$ |
| | (4) $0.25 + 0.75 = 1$ |
| | (5) $0 + 1 = 1$ |

If the number of traits is increased by one, an additional Hardy-Weinberg coefficient r must be introduced. For three traits there are fifteen possible combinations:

| | $p + q + r = 1$ |
|---|---|
| (1) | $1 + 0 + 0 = 1$ |
| (2) | $0.75 + 0.25 + 0 = 1$ |
| (3) | $0.75 + 0 + 0.25 = 1$ |
| (4) | $0.5 + 0.5 + 0 = 1$ |
| (5) | $0.5 + 0.25 + 0.25 = 1$ |
| (6) | $0.5 + 0 + 0.5 = 1$ |
| (7) | $0.25 + 0.75 + 0 = 1$ |
| (8) | $0.25 + 0.5 + 0.25 = 1$ |
| (9) | $0.25 + 0.25 + 0.5 = 1$ |
| (10) | $0.25 + 0 + 0.75 = 1$ |
| (11) | $0 + 1 + 0 = 1$ |
| (12) | $0 + 0.75 + 0.25 = 1$ |
| (13) | $0 + 0.5 + 0.5 = 1$ |
| (14) | $0 + 0.25 + 0.75 = 1$ |
| (15) | $0 + 0 + 1 = 1$ |

For m traits, the Mendelian condition in the form $p_1 + p_2 + \ldots + p_m = 1$ applies. The possible combinations, which conform to the auxiliary condition that the sum of the alleles is equal to four, are given for multidimensional systems. Certain entries are possible only at or above three, or even four, traits:

| Dimension | 2 | 3 | 4 | 5 | 6 | 7 | ... | m |
|---|---|---|---|---|---|---|---|---|
| $1 \times 1$ | 2 | 3 | 4 | 5 | 6 | 7 | ... | m |
| $2 \times 0.5$ | 1 | 3 | 6 | 10 | 15 | 21 | ... | $\sum_{i=1}^{m-1}(m-i)$ |
| $1 \times 0.75 + 1 \times 0.25$ | 2 | 6 | 12 | 20 | 30 | 42 | ... | $2\sum_{i=1}^{m-1}(m-i)$ |
| $1 \times 0.5 + 2 \times 0.25$ | | 3 | 12 | 30 | 60 | 105 | ... | $m\left[\binom{m-2}{2} + m - 2\right]$ |
| $4 \times 0.25$ | | | 1 | 5 | 15 | 35 | ... | $\sum_{j=4}^{m}\sum_{i=1}^{j-3}\left[\binom{i}{2}+i\right]$ |
| $i_1 + i_2 + \ldots + i_m$ | 5 | 15 | 35 | 70 | 126 | 210 | | |

Hardy-Weinberg Allele Classification

In addition to the Mendelian phenotype classification, in inheritance there is also a corresponding Hardy-Weinberg classification based on the associated allellic ratio. The possible allellic ratios and the corresponding Hardy-Weinberg classes (for three traits) are compared to one another below.

| (1) 4:0:0 | (6) 2:0:2 | (11) 0:4:0 |
|---|---|---|
| (2) 3:1:0 | (7) 1:3:0 | (12) 0:3:1 |
| (3) 3:0:1 | (8) 1:2:1 | (13) 0:2:2 |
| (4) 2:2:0 | (9) 1:1:2 | (14) 0:1:3 |
| (5) 2:1:1 | (10) 1:0:3 | (15) 0:0:4 |

The following table shows, for the general case, the number of possible Hardy-Weinberg classes under the auxiliary condition $i_1 + \ldots + i_m = 4$, and lists the five entries of which the results are composed.

| Dim. | $4 + \ldots$ | $3 + \ldots$ | $2 + \ldots$ | $1 + \ldots$ | $0 + \ldots$ | $i_1 + \ldots + i_m$ |
|---|---|---|---|---|---|---|
| 2 | 1 | 1 | 1 | 1 | 1 | 5 |
| 3 | 1 | 2 | 3 | 4 | 5 | 15 |
| 4 | 1 | 3 | 6 | 10 | 15 | 35 |
| 5 | 1 | 4 | 10 | 20 | 35 | 70 |

-continued

| Dim. | 4+ ... | 3+ ... | 2+ ... | 1+ ... | 0+ ... | $i_1 + \ldots + i_m$ |
|---|---|---|---|---|---|---|
| 6 | 1 | 5 | 15 | 35 | 70 | 126 |
| 7 | 1 | 6 | 21 | 56 | 126 | 210 |
| ⋮ | ⋮ | ⋮ | ⋮ | ⋮ | ⋮ | ⋮ |
| m | 1 | m−1 | $\sum_{i=1}^{m-1} i$ | $\sum_{j=1}^{m-1}\sum_{i=1}^{j} i$ | $\sum_{k=1}^{m-1}\sum_{j=1}^{k}\sum_{i=1}^{j} i$ | $\sum_{k=1}^{m}\sum_{j=1}^{k}\sum_{i=1}^{j} i$ |

Exactly one Hardy-Weinberg allele class is associated with each Mendelian phenotype class, but the converse is not true. For three traits the particular association is provided in the following table:

| Type | | | Mendelian class | | | | | Hardy-Weinberg class | | |
|---|---|---|---|---|---|---|---|---|---|---|
| | | rr | rg | gg | gb | bb | br | p | Q | r |
| 1 | 1 | 4 | 0 | 0 | 0 | 0 | 0 | 1 | 1 | 0 | 0 |
| 2, 4, 10, 28 | 2 | 2 | 2 | 0 | 0 | 0 | 0 | 2 | 0.75 | 0.25 | 0 |
| 3, 7, 19, 55 | 3 | 2 | 0 | 0 | 0 | 0 | 2 | 3 | 0.75 | 0 | 0.25 |
| 14, 32, 38, 40 | 4 | 0 | 2 | 2 | 0 | 0 | 0 | 7 | 0.25 | 0.75 | 0 |
| 42, 44, 50, 68 | 5 | 0 | 0 | 2 | 2 | 0 | 0 | 12 | 0 | 0.75 | 0.25 |
| 27, 63, 75, 79 | 6 | 0 | 0 | 0 | 0 | 2 | 2 | 10 | 0.25 | 0 | 0.75 |
| 54, 72, 78, 80 | 7 | 0 | 0 | 0 | 2 | 2 | 0 | 14 | 0 | 0.25 | 0.75 |
| 11, 13, 29, 31 | 8 | 1 | 2 | 1 | 0 | 0 | 0 | 4 | 0.5 | 0.5 | 0 |
| 21, 25, 57, 61 | 9 | 1 | 0 | 0 | 0 | 1 | 2 | 6 | 0.5 | 0 | 0.5 |
| 51, 53, 69, 71 | 10 | 0 | 0 | 1 | 2 | 1 | 0 | 13 | 0 | 0.5 | 0.5 |
| 41 | 11 | 0 | 0 | 4 | 0 | 0 | 0 | 11 | 0 | 1 | 0 |
| 5, 37 | 12 | 0 | 4 | 0 | 0 | 0 | 0 | 4 | 0.5 | 0.5 | 0 |
| 9, 73 | 13 | 0 | 0 | 0 | 0 | 0 | 4 | 6 | 0.5 | 0 | 0.5 |
| 45, 77 | 14 | 0 | 0 | 0 | 4 | 0 | 0 | 13 | 0 | 0.5 | 0.5 |
| 12, 16, 20, 22, 30, 34, 56, 58 | 15 | 1 | 1 | 0 | 1 | 0 | 1 | 5 | 0.5 | 0.25 | 0.25 |
| 15, 17, 33, 35, 47, 49, 65, 67 | 16 | 0 | 1 | 1 | 1 | 0 | 1 | 8 | 0.25 | 0.5 | 0.25 |
| 24, 26, 48, 52, 60, 62, 66, 70 | 17 | 0 | 1 | 0 | 1 | 1 | 1 | 9 | 0.25 | 0.25 | 0.5 |
| 6, 8, 46, 64 | 18 | 0 | 2 | 0 | 0 | 0 | 2 | 5 | 0.5 | 0.25 | 0.25 |
| 23, 39, 43, 59 | 19 | 0 | 2 | 0 | 2 | 0 | 0 | 8 | 0.25 | 0.5 | 0.25 |
| 18, 36, 74, 76 | 20 | 0 | 0 | 0 | 2 | 0 | 2 | 9 | 0.25 | 0.25 | 0.5 |
| 81 | 21 | 0 | 0 | 0 | 0 | 4 | 0 | 15 | 0 | 0 | 1 |

In the above table, the term "Type" in the left column denotes the number of possible combinations which a set of parents may have in the next generation, the filial generation (also referred to as the F1 generation). This type represents the allele types (the square of the number of genotypes, and thus the number of traits to the fourth power) and therefore the variety in classes, i.e., the maximum number of possible arrays.

Hardy-Weinberg Numbers

In genetics, combinations are only allowed within pentalogic which result in a sum of 1. Numbers which satisfy this normalization requirement are referred to as "Hardy-Weinberg numbers." The quantity of Hardy-Weinberg numbers is unlimited.

Figure 11A:
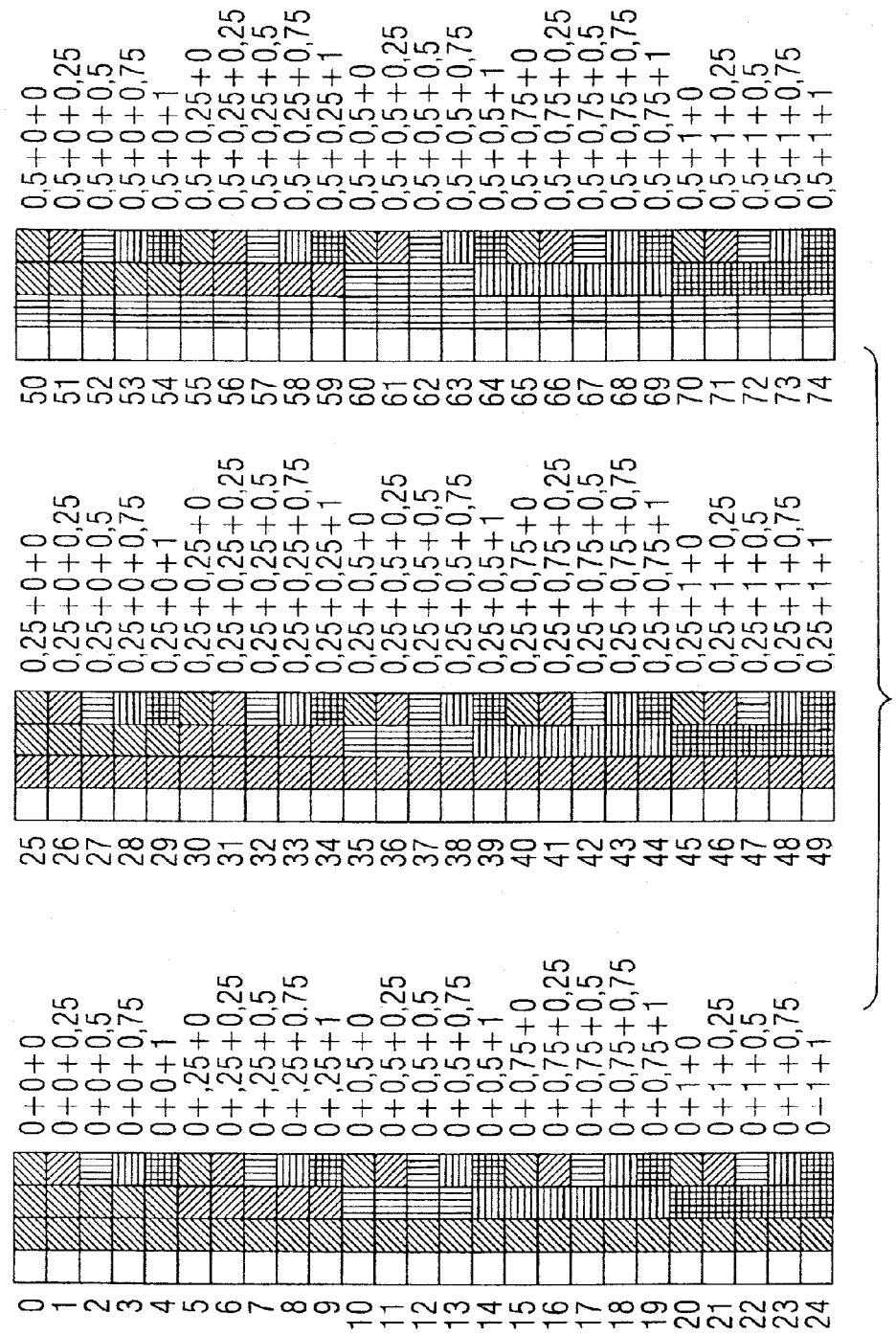
FIG. 11 shows the three-dimensional pentalogic system.
Figure 11B:
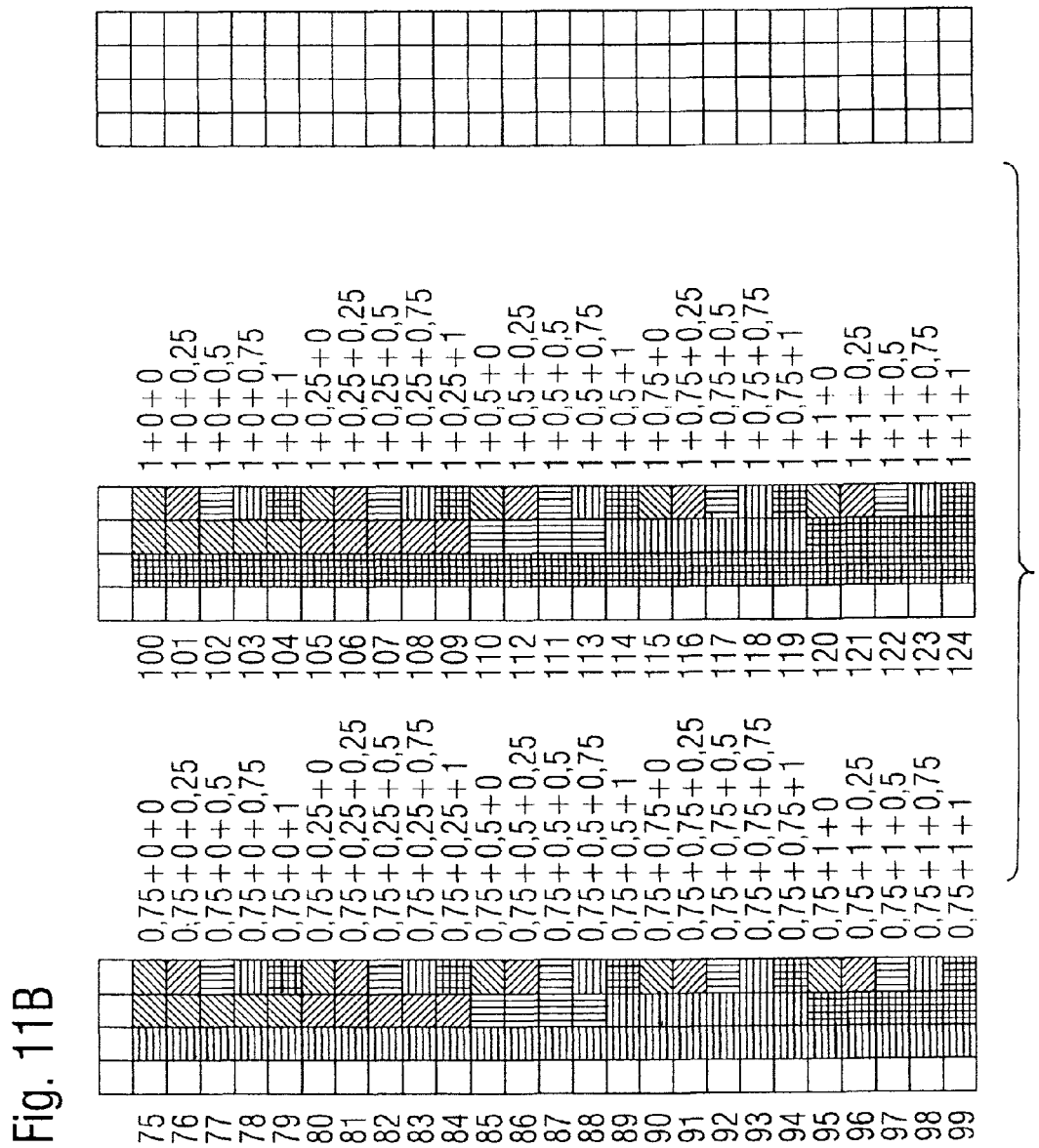

Hardy-Weinberg numbers of the nth order include Hardy-Weinberg numbers of the (n−1)th order (n≥2). The quantity of Hardy-Weinberg numbers within an order corresponds to the number of cases which satisfy the Mendelian condition that only members having a sum of 1 may be added. FIG. 11 shows all 125 combination possibilities in a three-dimensional RGB illustration. In the general case, i.e., for m traits, there is a total of $5^m$ combinations.

An algebraic representation of the pentalogic numbering system is obtained when the plus signs between two digits in FIG. 11 are simply omitted and the decimal numbers are represented by fractions. The numbers 0 to 4 may also be optionally used. Initial zeros may be omitted. The following table shows a comparison of the most common numbering systems. Whereas in the binary system (dual system) a new order must be started after every two numbers, in the Hardy-Weinberg (H.-W.) system this is necessary only after every five numbers (the number of fingers on the hand). In this regard, fewer digits are required than for the dual system, and fewer symbols are necessary compared to the decimal system, so that this represents a good compromise between two conflicting requirements.

| Hex. | Dual | Dec. | H.-W. |
|---|---|---|---|
| 0 | 0000 | 0 | 000 |
| 1 | 0001 | 1 | 001 |
| 2 | 0010 | 2 | 002 |
| 3 | 0011 | 3 | 003 |
| 4 | 0100 | 4 | 004 |
| 5 | 0101 | 5 | 010 |
| 6 | 0110 | 6 | 011 |
| 7 | 0111 | 7 | 012 |
| 8 | 1000 | 8 | 013 |
| 9 | 1001 | 9 | 014 |
| A | 1010 | 10 | 020 |
| B | 1011 | 11 | 021 |
| C | 1100 | 12 | 022 |
| D | 1101 | 13 | 023 |
| E | 1110 | 14 | 024 |
| F | 1111 | 15 | 030 |

Figure 12:
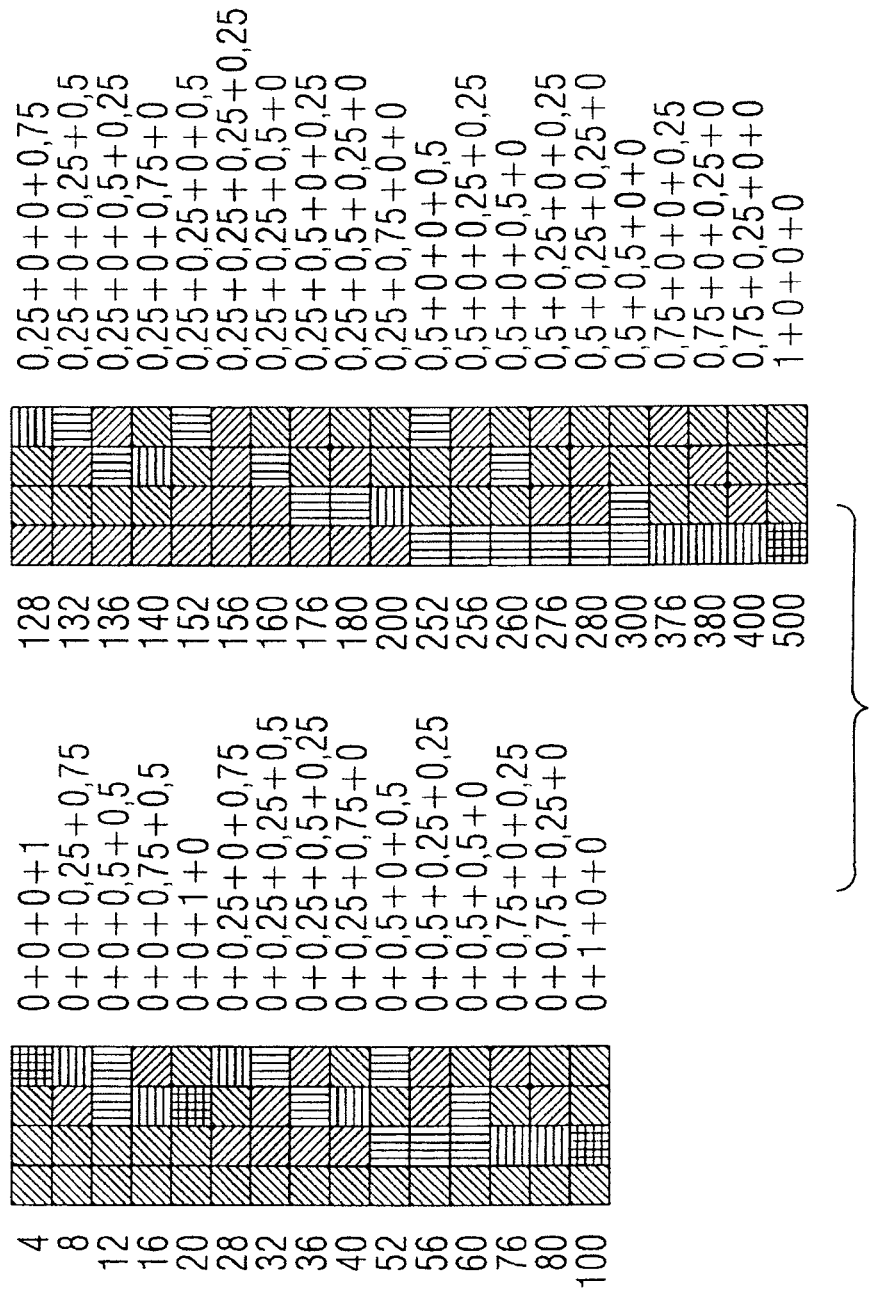
FIG. 12 shows the Hardy-Weinberg numbers up to and including the fourth order.

The 35 Hardy-Weinberg numbers up to and including the fourth order are illustrated in FIG. 12. A certain regularity of the formation law occurs which is not further discussed. It is only important that there are exactly as many Hardy-Weinberg numbers as there are Hardy-Weinberg classes. It is noted that Hardy-Weinberg numbers in their own system are represented differently than in the decimal system; namely, an allowed allele combination is always given for which the sum of digits cannot exceed 4.

Each Hardy-Weinberg number is divisible by four. As a rule, addition of Hardy-Weinberg numbers results in another Hardy-Weinberg number, although not all combinations are allowable if they do not satisfy the Mendelian condition. Other numbers within the pentalogic system may also be added to form a Hardy-Weinberg number, but not all combinations are meaningful in terms of inheritance. The next section describes the applicable rules for addition.

Computation Rules for Hardy-Weinberg Addition

Adding by digits is performed in the Hardy-Weinberg numbering system. Digits are added the same as for standard addition until their sum exceeds 4. If the sum is greater than 4, the value 5 is subtracted and the next higher digit is increased by 1. Thus, up to number 24 two digits are present, and up to number 124 three digits are present, and so forth. The method may be studied from the examples in the following table. In the table, only Hardy-Weinberg numbers whose sum results in another Hardy-Weinberg number have been added. The two summands correspond to the allele pairs of the parental generation for two or three traits.

| Equation | Addition |
|---|---|
| 4 + 4 = 8 | 04 + 04 = 13 |
| 8 + 4 = 12 | 13 + 04 = 22 |
| 12 + 4 = 16 | 22 + 04 = 31 |
| 8 + 8 = 16 | 13 + 13 = 31 |
| 16 + 4 = 20 | 31 + 04 = 40 |
| 12 + 8 = 20 | 22 + 13 = 40 |
| 20 + 8 = 28 | 040 + 013 = 103 |
| 16 + 12 = 28 | 031 + 022 = 103 |
| 12 + 16 = 28 | 022 + 031 = 103 |
| 8 + 20 = 28 | 013 + 040 = 103 |
| 28 + 4 = 32 | 103 + 004 = 112 |
| 20 + 12 = 32 | 040 + 022 = 112 |
| 16 + 16 = 32 | 031 + 031 = 112 |
| 12 + 20 = 32 | 022 + 040 = 112 |
| 4 + 28 = 32 | 004 + 103 = 112 |
| 32 + 4 = 36 | 112 + 004 = 121 |
| 28 + 8 = 36 | 103 + 013 = 121 |
| 20 + 16 = 36 | 040 + 031 = 121 |
| 36 + 4 = 40 | 121 + 004 = 130 |
| 32 + 8 = 40 | 112 + 013 = 130 |
| 28 + 12 = 40 | 103 + 022 = 130 |
| 20 + 20 = 40 | 040 + 040 = 130 |
| 40 + 12 = 52 | 130 + 022 = 202 |
| 36 + 16 = 52 | 121 + 031 = 202 |
| 32 + 20 = 52 | 112 + 040 = 202 |
| 52 + 4 = 56 | 202 + 004 = 211 |
| 40 + 16 = 56 | 130 + 031 = 211 |
| 36 + 20 = 56 | 121 + 040 = 211 |
| 28 + 28 = 56 | 103 + 103 = 211 |
| 56 + 4 = 60 | 211 + 004 = 220 |
| 52 + 8 = 60 | 202 + 013 = 220 |
| 40 + 20 = 60 | 130 + 040 = 220 |
| 32 + 28 = 60 | 112 + 103 = 220 |
| 60 + 16 = 76 | 220 + 031 = 301 |
| 56 + 20 = 76 | 211 + 040 = 301 |
| 40 + 36 = 76 | 130 + 121 = 301 |
| 76 + 4 = 80 | 301 + 004 = 310 |
| 60 + 20 = 80 | 220 + 040 = 310 |
| 52 + 28 = 80 | 202 + 103 = 310 |
| 40 + 40 = 80 | 130 + 130 = 310 |
| 80 + 20 = 100 | 310 + 040 = 400 |
| 60 + 40 = 100 | 220 + 130 = 400 |

Corresponding rules also apply to multiplication, but these do not require discussion here.

Use of Inheritance in Data Fusion

The previously established rules may be used according to the invention in data fusion for object classification. Each "viewed" object inherits the characteristic of its sensor. These characteristics must be correlatable, but for spatially unchangeable objects the characteristics may also go back in time, in which case contemporaneous measurement is not necessary. One exception is equilibrium processes which change slowly over time, for example thermal cooling depending on momentarily supplied energy (after switching off an engine, for example).

All characteristics of the observed object are fused in pairs. Inherited characteristics may be added in the form of allele pairs.

Different phenotypes, which may be combined into a genotype either immediately or by degrees (via data link), are obtained as observation results on each platform provided with sensors for object observation, depending on the sensors used. Only the genotype allows a clear classification regarding the Mendelian type and the allellic ratio. The more inherited characteristics used in the successive generation, the more reliable the identification. Thus, the method essentially corresponds to a genetic DNA analysis, wherein based on a finite number of traits a statistical extrapolation may be made of the significance of the match.

The objects to be identified must be classified by Mendelian type and stored in an object database, although the object list need only state the objects which correspond to a particular Mendelian type. However, it is necessary for the object to have been "thought out" beforehand, and the attributes which constitute the object must be associated with the object. As an example, for a radar object it is sufficient to measure a peak, using a radar sensor, and to localize the signal. For the identification, the traits of other sensors are then used, whereby a trait, namely, the speed of the object, as independent secondary information may in fact again originate from the radar sensor. These two information items are sufficient to classify the viewed object as a vehicle or aircraft. To refine the classification, the traits must also be refined; for example, typical speed classes may be introduced as contextual knowledge. Upon confirmation of the trait that the speed is in the expected range, for example a commercial aircraft in the subsonic range may be clearly distinguished from an aircraft in the supersonic range. Further distinctions may be made, for example on the basis of the object size. Here as well, it is sufficient to introduce a characteristic differentiating size, below which all objects are classified either as an automobile or a truck. This requires a sensor which is able to measure the object size. If an object is uniformly warmer than the ambient temperature, the object size may be determined using an infrared sensor which measures the infrared characteristic of the object and allows an approximate determination of the object size. To then make the fundamental decision as to whether a targeted vehicle is friend or foe requires detection of a friend/foe characteristic. In the simplest case, contextual knowledge may be used as a trait for this purpose, for example by regarding as a foe any moving object in an identified geographic area which has the characteristics in question. When friendly forces are in operation in enemy territory, only active friend/foe recognition is able to distinguish enemy vehicles or occupants from friendly vehicles/occupants. Characteristics may also be stated as hostile in a targeted manner, for example by checking the explosive characteristic using a suitable sensor. If this characteristic is identified in the located vehicle, there is a higher probability that the vehicle is transporting weapons, and the vehicle may therefore be classified as hostile. In any case, when a threat is identified a check must always be made concerning possible misdirection and camouflage which may have been employed against the imminent identification.

Determination of the Mendelian Type and Inheritance Class

Mendelian inheritance types may be determined in any given generation (for only three traits, F0 and F1 are entirely sufficient), since the allelic ratio is always inherited (in the absence of selection, alleles are preserved in inheritance). After summing the phenotypes, the phenotypic ratio must be expressed as the lowest common denominator. Since not every phenotypic ratio is allowable, a transformation must be made to an allowable ratio, using the rules for phenotypic conversion. Based on the preservation of alleles in inheritance, the following rules for phenotypic conversion may also be derived.

Let x, y, and z be three different alleles of a polymorphic gene. The following computation rules then apply:

| | |
|---|---|
| xy = yx | Commutative law |
| xx + yy = 2xy | Pythagorean theorem |
| xx + yz = xy + xz | Distributive law |
| xx + yy + zz = xy + yz + zx | Pythagorean theorem |
| xy + yz = xz + yy | Associative law |

Accordingly, the same number of alleles must be present on both the left and right sides of the equations. By using these rules it is possible to form heterozygotes from homozygotes, and vice versa.

To avoid ambiguity, the ratio of the measurements must also be taken into account. The Mendelian type must be homozygous when the ratio is asymmetric, and vice versa.

The following example is provided: An object has three characteristics (r, g, b), and is observed using four sensors (two of which are identical). First, the "offspring" are collected in pairs for all platform combinations. Autocorrelations between sensors which are to be associated with the same platform are treated as cross correlations. Lastly, the genotype is combined from the phenotypes, and the allellic ratio is determined from same. "Missing" offspring must be added for inconsistent ratios. These offspring may also derive from inheritance. In any case, the genotype must be expressed as an allowable phenotypic ratio and allellic ratio. Duplicate allele pairs may be deleted, and allele pairs which are already present may be re-added. This unambiguously results in the Mendelian type, and thus results in the phenotype class as well as the Hardy-Weinberg class.

An allellic ratio is even-numbered when the addition of a sensor for an existing characteristic generally alters the allellic ratio, resulting in greater reliability of a trait. A further differentiation possibility for classification is thus obtained, since, once made, a classification is inherited, provided that no new trait is added. If an individual trait is redetermined at a later point in time, the type is not altered, provided that the object itself is preserved (example: two sensors red, one sensor green, R:G=2:1, i.e., either 2:2 or 3:1; or three sensors red, one sensor green, R: G=3:1).

Use of Hardy-Weinberg Logic in Target Tracking

If two moving objects merge because their tracks intersect, after the objects diverge they may be reassigned using the Hardy-Weinberg classification system, provided that the same sensors are used as when the objects were previously located. However, if the two objects were not distinguishable with regard to type before the intersection, they remain undistinguishable after the intersection.

Advantages of Object-Oriented Object Recognition

If multiple phenotypes of an object are combined by data fusion to provide the most complete description possible of the observed object, due to its object orientation the "fuzzy logic" presented here is better suited than traditional binary logic, which recognizes only two truth values. Standard logic is based on absolute decisions. Conditions must be identified as 100% correct before a decision may be made. Almost without exception this conflicts with reality, in which only probabilities are usually discussed.

In Hardy-Weinberg logic, a truth value less than 1 may also be sufficient to make a correct decision, with low residual risk which is adapted to the circumstances in each case. Thus, in the military sector it is possible, for example, to engage an enemy earlier than he actually might have been engaged (namely, when he has been identified with 100% certainty as an enemy). It is also possible to initiate countermeasures earlier than they normally would be carried out (namely, at a time which might be too late).

Exemplary Embodiments of the Method According to the Invention

The method according to the invention and the principle of data fusion implemented therein are explained in greater detail below, with reference to the figures.

Figure 13:
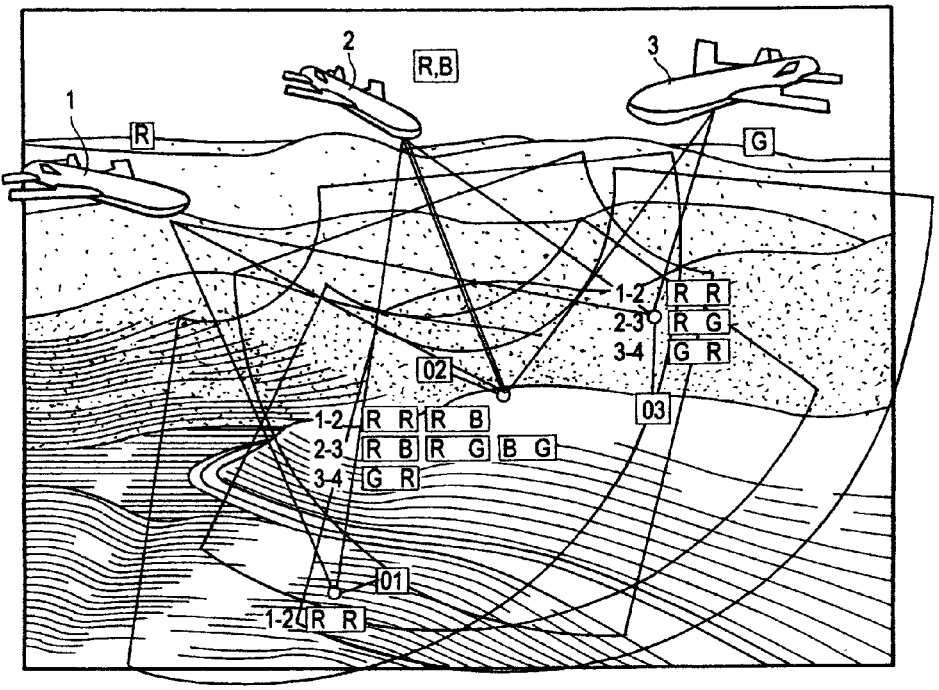
FIG. 13 shows a first object detection in one exemplary embodiment of the invention.

FIG. 13 shows a region of the earth's surface in which objects to be reconnoitered are presumed to be present. This region is overflown by three reconnaissance aircraft 1, 2, 3. The aircraft 1, 2, 3 are equipped with various sensors. The sensors are generally referred to here by the letters R, G, and B. Aircraft 1 is provided with a sensor R. Aircraft 2 is provided with a sensor R and a sensor B, and aircraft 3 is provided with a sensor G.

In the situation illustrated in FIG. 13, the positions of three different objects O1, O2, O3 are located by the three aircraft 1, 2, 3. Object O1 is detected by sensors R of aircraft 1 and 2. Object O2 is detected by sensor R of aircraft 1, by sensors R and B of aircraft 2, and by sensor G of aircraft 3. Object O3 is detected by sensor R of aircraft 1, by sensor R of aircraft 2, and by sensor G of aircraft 3. Identification characteristic pairs are associated with the individual objects by paired combination of the sensor characteristics, based on the sensor signals sent by the sensors of the three aircraft, wherein the following applies:

For object O1:
The detection by sensor R of aircraft 1 and by sensor R of aircraft 2 results in characteristic pair RR;

For object O2:
The detection by sensor R of aircraft 1 and by sensors R and B of aircraft 2 results in the identification characteristics RR and RB. The detection by sensors R and B of aircraft 2 and by sensor G of aircraft 3 results in the identification characteristic pairs RB, RG, and BG. The detection by sensor G of aircraft 3 and by sensor R of aircraft 1 results in identification characteristic pair GR. Thus, for object O2 this results in identification characteristic pairs RR, RB, RB, RG, BG, and GR;

For object O3:
The detection by sensor R of aircraft 1 and by sensor R of aircraft 2 results in identification characteristic pair RR. The detection by sensor R of aircraft 2 and by sensor G of aircraft 3 results in identification characteristic pair RG, and the detection of object O3 by sensor G of aircraft 3 and by sensor R of aircraft 1 results in identification characteristic pair GR. Thus, for object O3 this results in identification characteristic pairs RR, RG, and GR.

The identification characteristic pairs of the three objects determined in this manner are combined for each object to form a collection of identification characteristic pairs; in the combination of the determined identification characteristic pairs, in a first intermediate step identification characteristic pairs which were determined multiple times are accepted into the collection only once. The sequence of the characteristics within the identification characteristic pairs remains unconsidered, so that, for example, RG=GR is valid. For the individual objects, this results in the following preliminary collections of identification characteristic pairs:
Object O1: RR
Object O2: RR, RB, RG, and BG
Object O3: RR, RG In a second intermediate step these preliminary collections of identification characteristic pairs are then checked to determine whether they correspond to an allele class. This check may be easily made by examining the number of identification characteristic pairs formed, and determining whether they correspond to the condition $2^n$, for all nμ1. This condition is satisfied for object O2, having four classes ($=2^2$), and for object 3, having two classes ($=2^1$). Only object O1, which has only one identification characteristic pair, does not satisfy this condition.

If the above-referenced condition is not satisfied, a preliminary collection of identification characteristic pairs may be formed by supplementing the existing identification characteristic pairs with any given identification characteristic pairs from the set of existing identification characteristic pairs for the corresponding object. For this purpose, any given number of existing identification characteristic pairs are multiplied until the required total number of identification characteristic pairs results in the next value of $2^n$. Thus, in the present case, for object O1 the existing identification characteristic pair RR would be doubled, resulting in a collection of identification characteristic pairs for object O1 which contains two identification characteristic pairs RR, RR ($=2^1$) and which thus satisfies the referenced condition.

Thus, for the individual objects the following collections of identification characteristic pairs are valid:
Object O1: RR, RR->Parental generation (F0)
Object O2: RR, RB, RG, and BG->Filial generation (F1)
Object O3: RR, RG->Parental generation (F0)

Figure 14:
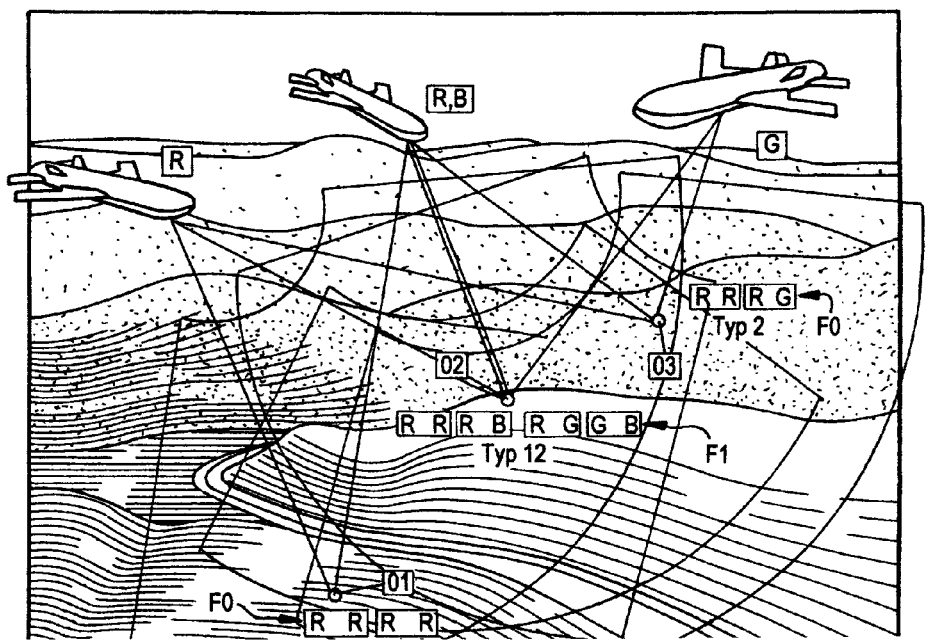
FIG. 14 is an illustration of collected identification characteristic pairs after the first object detection.

This is illustrated in FIG. 14.

Thus, object O1 corresponds to phenotype 1 of the F0 generation, object O2 corresponds to phenotype 12 of the F1 generation, and object O3 corresponds to phenotype 2 of the F0 generation.

Figure 15:
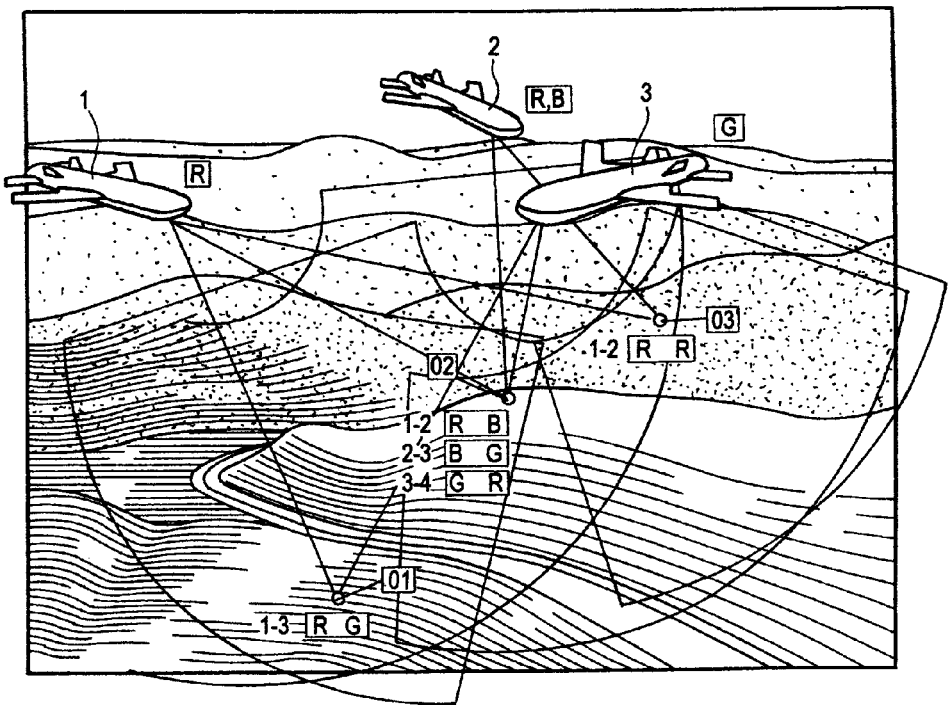
FIG. 15 shows a second object detection in the exemplary embodiment of the invention.

A new observation of the region is made by aircraft 1, 2, and 3 at a later point in time (FIG. 15). Sensor R of aircraft 1 once again detects objects O1, O2, and O3. Sensor B of aircraft 2 now detects object O2, and sensor R of aircraft 2 detects object O3. Sensor G of aircraft 3 detects objects O1 and O2. By paired combination of the sensor characteristics to which the individual objects have responded, the following preliminary identification characteristic pairs are formed for this current observation:
Object O1: RG
Object O2: RB, BG, GR
Object O3: RR Examination of the investigation result of the first observation, corrected for doublets, illustrated in FIG. 14 and of the result of the second observation illustrated in FIG. 15 reveals that in both observations the observed identification characteristics of the individual objects O1, O2, and O3 differ from one another. For example, due to the isolated observation of the two reconnaissance results the observer does not know whether he should then identify object O1 based on characteristics RR or characteristics RG.

Figure 16:
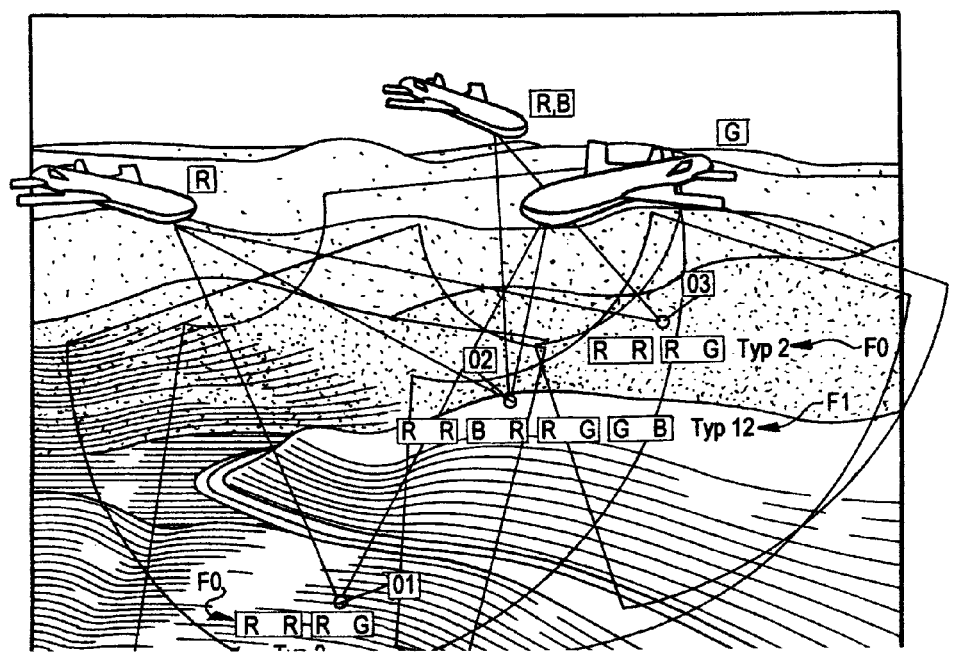
FIG. 16 shows a result of the data fusion according to the invention from the first and second object detections.

At this point the method of the present invention provides the further technical teaching of linking together not only the information about the object obtained from multiple sensors, but also the information from observations carried out at different points in time, i.e., to pass down information about the object, obtained in previous observations, to an observation of the same object carried out at a later time. This is illustrated in FIG. 16.

Thus, object O1 passes down the identification characteristic pairs RR, RR obtained in the first observation (FIG. 14) to the result (RG) of the second observation (FIG. 15), so that after deletion of the duplicate identification characteristic pair RR, the identification characteristic pairs RR and RG are then associated with object O1. This population of the identification characteristic pairs of object O1 corresponds to allele type 2 of parental generation F0.

With regard to the second object O2, the identification characteristic pairs RR, RB, RG, and BG obtained from the first observation (FIG. 14) are fused with the identification characteristic pairs RB, RG, and BG obtained in the second observation (FIG. 14), resulting in a population of the identification characteristic pairs RR, BR, RG, and GB (BG=GB) for object O2. This unchanged population also corresponds to allele type 12 of filial generation F1.

The identification characteristic pairs RR, RG obtained from the first observation (FIG. 13) for object O3 are fused with identification characteristic pair RR obtained in the second observation (FIG. 15), and after deletion of the duplicate identification characteristic pair RR result in the population of the identification characteristic pairs RR, RG. This also corresponds to allele type 2 of parental generation F0.

As a result of the information obtained in the second observation step (FIG. 15) and the fusion of this information using object information derived from the first observation step (FIG. 13), no new information is obtained for objects O2 and O3, but the phenotype of object O1 is interchanged due to the fusion of the information from the first observation and the second observation, thus allowing more precise information about first object O1 to be obtained.

It is understood that new information about the individual objects may be obtained by making further observations, and that by means of the data fusion in the method according to the invention the existing information about the individual objects may be linked to new information, which for the individual objects then results in a collection of identification characteristics which may result in higher inheritance classes, so that the gained information about the individual object characteristics increases. This increase, as in the example, may be achieved by multiple consecutive observations, or by increasing the number of sensors or the number of observing aircraft provided with sensors. The two above-referenced alternatives may also be combined, thus allowing the number of sensors as well as the number of observations to be increased.

The collections of identification characteristic pairs obtained in this manner for the individual objects are then compared to object characteristic classes stored in an object database, so that the objects may be identified based on this comparison. The greater the amount of information obtained about an object, i.e., the higher the generation number of the information, the more reliable and accurate the object identification. Thus, for the example shown, the identification of object O2 via filial generation F1 results in greater reliability of identification than the identification of objects O1 or O3, which have been associated only with parental generation F0.

The genetic classification of traits upon which the present invention is based allows a much finer differentiation than the classical system due to the fact that the former takes into account the allellic ratios as well as the phenotype configuration (heterozygous, homozygous, or both). Not counting the equivalent classes, the number of remaining differentiation possibilities is still much greater than for a simple classical classification. This ratio increases significantly in favor of the method according to the invention as the number of traits increases. For two traits, there are three phenotypes but 16 allele types (16:3 ratio=5.3), and for three traits there are six phenotypes but 81 allele types (81:6 ratio=13.5). This higher yield of distinctions is a great advantage of the method according to the invention. Although not every distinction is externally visible, it is still inherently present. Not counting the undistinguishable equivalent allele classes, for two traits there are three phenotypes but six allele classes (6:3 ratio=2.0), and for three traits there are six phenotypes but 21 allele classes (21:6 ratio=3.5) available for object identification.

For m alleles, the use of allele types for differentiation (expressions of the object characteristic) allows classification using an $m^4$ principle. For classification using allele classes the formula in the right column of FIG. 6 would be used; the term "Mendelian classes," which is synonymous with "allele classes," has been used in FIG. 6. In a simplified manner, the following formula may also be used for this classification:

$$\frac{(m^2+m)}{4}\left[\frac{(m^2+m)}{2}+1\right]$$

In contrast, the phenotype classification is accompanied by a weaker dependency, namely, $(m^2+m)/2$. This would be the simplest type of classical classification, but its effectiveness for object recognition is greatly surpassed by the classification according to the invention according to allele class types. The following table shows how much more accurately object recognition according to the invention, based on the allele classes as object characteristic classes or as identification characteristic classes, may be carried out compared to classical object recognition according to phenotype classes.

| Number m of traits (alleles) | Phenotype classes (classical) | Allele classes | Allele types |
|---|---|---|---|
| 2 | 3 | 6 | 16 |
| 3 | 6 | 21 | 81 |
| 4 | 10 | 55 | 256 |
| 5 | 15 | 120 | 625 |
| 6 | 21 | 231 | 1296 |
| 7 | 28 | 406 | 2401 |
| 8 | 36 | 666 | 4096 |
| 9 | 45 | 1035 | 6561 |
| 10 | 55 | 1540 | 10000 |
| 11 | 66 | 2211 | 14641 |
| 12 | 78 | 3081 | 20736 |
| 13 | 91 | 4186 | 28561 |
| 14 | 105 | 5565 | 38416 |
| 15 | 120 | 7260 | 50625 |
| 16 | 136 | 9316 | 65536 |

If the doublets are removed from the number of allele types, so that the sequence of traits (characteristics) remains unconsidered (for example, "RG"="GR"), the values in the "allele classes" column are obtained.

Figure 17:
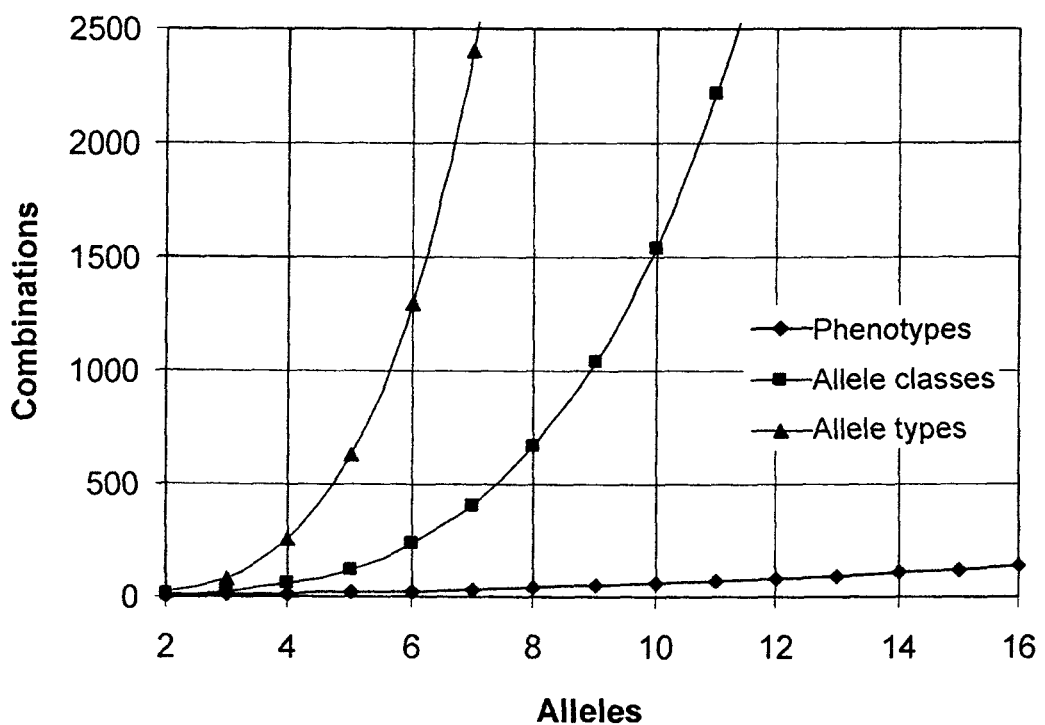
FIG. 17 shows an overview of various classification possibilities.

The relationship between the number of phenotype classes (classical object recognition), the number of allele classes, and the number of allele types, in each case for m traits or alleles, based on the above table is represented as a graphical function in FIG. 17.

The invention may also, of course, be implemented in the form of a non-transitory computer readable medium encoded in a non-transitory manner with a computer program that includes the process steps discussed herein, or in the form of a system including sensors, such as described above, and a computer that accesses a non-transitory computer readable medium that is so encoded. Reference characters in the claims, the description, and the drawings are used solely for better understanding of the invention, and do not limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for recognizing an object that has a plurality of expressions of abstract object characteristics, and is associated with an object characteristic class of a hierarchical system of object characteristic classes stored in a first memory; said method comprising:
1.1) observing at least one location at which the object is presumed to be present, using a plurality of sensors in a sensor suite, each of said sensors responding to at least one object characteristic, and accordingly emitting a sensor signal;
1.2) checking whether each of the emitted sensor signals exceeds a specified threshold value for the sensor signals, accepting sensor signals which exceed the threshold value, and storing the accepted sensor signals in a second memory;
1.3) pairing combinations of the sensor characteristics for the accepted sensor signals obtained in 1.2) to form identification characteristic pairs;
1.4) comparing the identification characteristic pairs obtained in 1.3) to the object characteristic classes stored in the first memory; and
1.5) identifying the object, based on the object characteristic class, whose object characteristic pairs are identical to the identification characteristic pairs obtained in 1.3).

2. The method according to claim 1, wherein: 1.3) is carried out according to the rules of Mendelian genetics, whereby the number of identification characteristic pairs in each collection corresponds to a value of $2^n$, where n satisfies the condition nμ1; and
to achieve this condition, doublets of identification characteristic pairs determined multiple times are initially omitted, and if the condition still cannot be satisfied, identification characteristic pairs which are already present are then multiplied until the condition is satisfied.

3. The method according to claim 1, wherein the at least one location in 1.1) is observed by scanning a region in which the object is presumed to be present.

4. The method according to claim 3, wherein the following are carried out after 1.2): 1.2.1) detecting location coordinates for each accepted sensor signal; 1.2.2) associating the location coordinates with the accepted sensor signal; and 1.2.3) storing the associated location coordinates together with the accepted sensor signals in the second memory.

5. The method according to claim 1, wherein:
a time signal representing a point in time at which the sensor signal was detected is associated with each accepted sensor signal; and
the respective associated time signals are stored together with the accepted sensor signals in the second memory.

6. The method according to claim 1, wherein:
in addition to a sensor that is already present, the plurality of sensors includes at least one additional sensor, which responds to at least one object characteristic; and
said additional sensor emits a sensor signal which is also accepted for further processing only when it exceeds a specified threshold value.

7. The method according to claim 1, wherein:
the observation of the at least one location in 1.1) by different sensors is carried out by at least a portion of the sensors at different points in time; and
1.3) and 1.4) are carried out when all sensors have observed the location.

8. The method according to claim 1, wherein:
observation of the location in 1.1) by different sensors is carried out multiple times in succession by at least a portion of the sensors; 1.3) is run through for the population of observations carried out;
identification characteristic pairs determined from the population of observations carried out are combined according to the rules of Mendelian genetics to form a collection of identification characteristic pairs;
the number of the identification characteristic pairs in each collection corresponds to a value of $2^n$, where n satisfies the condition $n \mu 1$; and
to achieve said condition, in combining the determined identification characteristic pairs, multiply determined identification characteristic pairs are initially accepted into the collection only once, and if said condition still cannot be satisfied, identification characteristic pairs which are already present are multiplied until this condition is satisfied; and
in 1.4) the identification characteristic pairs combined in the collection are compared to the stored object characteristic pairs.

9. The method according to claim 1, wherein when the sensor characteristics are combined in 1.3), doublets of multiply present identification characteristic pairs are not considered, and the sequence of identification characteristics in an identification characteristic pair remains unconsidered.

10. The method according to claim 1, wherein the hierarchical object characteristic classes are formed by classifying the object characteristic pairs formed from the object characteristics.

11. The method according to claim 10, wherein:
the number of object characteristic pairs in an object characteristic class corresponds to a value of $2^n$, where n satisfies the condition $n \mu 1$;
to achieve said condition, in the classification of the object characteristic pairs, doublets of multiply present identification characteristic pairs are initially not considered, and for this purpose the sequence of identification characteristics in an identification characteristic pair remains unconsidered; and
if the condition still cannot be satisfied, identification characteristic pairs which are already present are multiplied until the condition is satisfied.

12. A system for recognizing an object that has a plurality of expressions of abstract object characteristics, and is associated with an object characteristic class of a hierarchical system of object characteristics classes; said system comprising:
a first memory having said hierarchical system of object classes stored therein;
a plurality of sensors, each of which responds to at least one object characteristic and emits a corresponding sensor signal;
a data processor; and
a non-transitory computer readable medium encoded with a series of commands which cause the system to perform following steps:
1.1) said plurality of sensors observing at least one location at which the object is presumed to be present;
1.2) checking whether each of the emitted sensor signals exceeds a specified threshold value for the sensor signals, accepting sensor signals which exceed the threshold value, and storing the accepted sensor signals in a second memory;
1.3) pairing combinations of the sensor characteristics for the accepted sensor signals obtained in 1.2) to form identification characteristic pairs;
1.4) comparing the identification characteristic pairs obtained in 1.3) to the object characteristic classes stored in the first memory; and
1.5) identifying the object, based on the object characteristic class, whose object characteristic pairs are identical to the identification characteristic pairs obtained in 1.3).

13. The system according to claim 12, wherein: 1.3) is carried out according to the rules of Mendelian genetics, whereby the number of identification characteristic pairs in each collection corresponds to a value of $2^n$, where n satisfies the condition $n \mu 1$; and
to achieve said condition, doublets of identification characteristic pairs determined multiple times are initially omitted, and if the condition still cannot be satisfied, identification characteristic pairs which are already present are then multiplied until the condition is satisfied.

14. The system according to claim 13, wherein the following are carried out after 1.2):
1.2.1) detecting location coordinates for each accepted sensor signal;
1.2.2) associating the location coordinates with the accepted sensor signal; and
1.2.3) storing the associated location coordinates together with the accepted sensor signals in the second memory.

15. The system according to claim 14, wherein:
a time signal representing a point in time at which the sensor signal was detected is associated with each accepted sensor signal; and
the respective associated time signals are stored together with the accepted sensor signals in the second memory.

16. The system according to claim 12, wherein:
observation of the location in 1.1) by different sensors is carried out multiple times in succession by at least a portion of the sensors;
1.3) is run through for the population of observations carried out;
identification characteristic pairs determined from the population of observations carried out are combined according to the rules of Mendelian genetics to form a collection of identification characteristic pairs;
the number of the identification characteristic pairs in each collection corresponding to a value of $2^n$ where n satisfies the condition $n \mu 1$; and
to achieve said condition, in combining the determined identification characteristic pairs, multiply determined identification characteristic pairs are initially accepted into the collection only once, and if said condition still cannot be satisfied, identification characteristic pairs which are already present are multiplied until this condition is satisfied; and in 1.4) the identification characteristic pairs combined in the collection are compared to the stored object characteristic pairs.

17. A non-transitory computer readable medium encoded in a non-transient manner with a program for causing an object recognition system to perform the following steps:
- 1.1) observing at least one location at which the object is presumed to be present, using a plurality of sensors in a sensor suite, each of said sensors responding to at least one object characteristic, and accordingly emitting a sensor signal;
- 1.2) checking whether each of the emitted sensor signals exceeds a specified threshold value for the sensor signals, accepting sensor signals which exceed the threshold value, and storing the accepted sensor signals in a second memory;
- 1.3) pairing combinations of the sensor characteristics for the accepted sensor signals obtained in 1.2) to form identification characteristic pairs;
- 1.4) comparing the identification characteristic pairs obtained in 1.3) to the object characteristic classes stored in the first memory; and
- 1.5) identifying the object, based on the object characteristic class, whose object characteristic pairs are identical to the identification characteristic pairs obtained in 1.3).

18. The computer readable medium according to claim 17, wherein:
- 1.3) is carried out according to the rules of Mendelian genetics, whereby the number of identification characteristic pairs in each collection corresponds to a value of $2^n$, where n satisfies the condition $n\mu1$; and
- to achieve this condition, doublets of identification characteristic pairs determined multiple times are initially omitted, and if the condition still cannot be satisfied, identification characteristic pairs which are already present are then multiplied until the condition is satisfied.

19. The computer readable medium according to claim 18, wherein:
- 1.2.1) detecting location coordinates for each accepted sensor signal;
- 1.2.2) associating the location coordinates with the accepted sensor signal; and
- 1.2.3) storing the associated location coordinates together with the accepted sensor signals in the second memory.

20. The computer readable medium according to claim 17, wherein:
- observation of the location in 1.1) by different sensors is carried out multiple times in succession by at least a portion of the sensors;
- 1.3) is run through for the population of observations carried out;
- identification characteristic pairs determined from the population of observations carried out are combined according to the rules of Mendelian genetics to form a collection of identification characteristic pairs;
- the number of the identification characteristic pairs in each collection corresponds to a value of $2^n$, where n satisfies the condition $n\mu1$; and
- to achieve said condition, in combining the determined identification characteristic pairs, multiply determined identification characteristic pairs are initially accepted into the collection only once, and if said condition still cannot be satisfied, identification characteristic pairs which are already present are multiplied until this condition is satisfied; and
- in 1.4) the identification characteristic pairs combined in the collection are compared to the stored object characteristic pairs.

* * * * *